United States Patent
Noda et al.

(10) Patent No.: US 11,794,336 B2
(45) Date of Patent: *Oct. 24, 2023

(54) EXTERNALLY-DRIVEN JOINT STRUCTURE

(71) Applicants: ADVANCED TELECOMMUNICATIONS RESEARCH INSTITUTE INTERNATIONAL, Kyoto (JP); OSAKA UNIVERSITY, Suita (JP)

(72) Inventors: Tomoyuki Noda, Kyoto (JP); Yoshihiro Nakata, Suita (JP); Hiroshi Ishiguro, Suita (JP); Jun Morimoto, Kyoto (JP)

(73) Assignees: ADVANCED TELECOMMUNICATIONS RESEARCH INSTITUTE INTERNATIONAL, Kyoto (JP); OSAKA UNIVERSITY, Suita (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,166

(22) Filed: Apr. 6, 2022

(65) Prior Publication Data

US 2022/0226983 A1 Jul. 21, 2022

Related U.S. Application Data

(63) Continuation of application No. 16/077,349, filed as application No. PCT/JP2017/004922 on Feb. 10, 2017, now Pat. No. 11,325,244.

(30) Foreign Application Priority Data

Feb. 10, 2016 (JP) ................................. 2016-024182

(51) Int. Cl.
*B25J 9/08* (2006.01)
*F16C 35/06* (2006.01)
(Continued)

(52) U.S. Cl.
CPC ................. *B25J 9/08* (2013.01); *B25J 9/104* (2013.01); *B25J 13/088* (2013.01); *B25J 17/00* (2013.01);
(Continued)

(58) Field of Classification Search
CPC ... B25J 9/08; B25J 9/104; B25J 13/088; B25J 17/00; B25J 17/02; B25J 17/0241; F16C 35/06; F16C 35/061
See application file for complete search history.

(56) References Cited

U.S. PATENT DOCUMENTS 5,355,743 A 10/1994 Tesar
8,196,492 B1 * 6/2012 Denu ....................... B25J 9/042
414/744.5

(Continued)

FOREIGN PATENT DOCUMENTS

CN 2474991 Y 1/2002
CN 1474736 A 2/2004
(Continued)

OTHER PUBLICATIONS

EP 2859998 A1 (Christophe Maufroy) Apr. 15, 2015 (full text). [online] [retrieved on Jan. 24, 2023]. Retrieved from: ProQuest Dialog. (Year: 2015).*

(Continued)

*Primary Examiner* — Joseph Brown
(74) *Attorney, Agent, or Firm* — Knobbe, Martens, Olson & Bear, LLP

(57) ABSTRACT

A modularized externally-driven joint structure that can be used for general purposes. In one aspect, an externally-driven joint structure includes: a shaft member that extends in an axial direction; and a plurality of rotatable members that are arranged along the axial direction, and are coupled with each other by the shaft member in an axially rotatable (Continued)

manner. Each of the rotatable members includes a pair of face portions that face each other in the axial direction, a side wall portion that is arranged along the outer circumferential edges of the pair of face portions, and at least one coupling portion that is arranged at the face portions or the side wall portion, and is coupled with a link member constituting a link of a robot.

12 Claims, 22 Drawing Sheets

(51) Int. Cl.
    *B25J 13/08*     (2006.01)
    *B25J 17/00*     (2006.01)
    *B25J 9/10*     (2006.01)
    *B25J 17/02*     (2006.01)

(52) U.S. Cl.
    CPC ........... *B25J 17/02* (2013.01); *B25J 17/0241* (2013.01); *F16C 35/06* (2013.01)

(56) References Cited

U.S. PATENT DOCUMENTS

| | | | |
|---|---|---|---|
| 2004/0032233 | A1 | 2/2004 | Miyazaki et al. |
| 2004/0261179 | A1 | 12/2004 | Blumenkranz |
| 2009/0047161 | A1 | 2/2009 | Ginies et al. |
| 2009/0074340 | A1* | 3/2009 | Jimenez De Castro ............ F16C 19/54 384/513 |
| 2010/0116078 | A1 | 5/2010 | Kim |
| 2010/0263470 | A1 | 10/2010 | Laymon et al. |
| 2011/0167945 | A1 | 7/2011 | Yang et al. |
| 2011/0257786 | A1 | 10/2011 | Caron L'Ecuyer et al. |
| 2012/0204670 | A1 | 8/2012 | Ryland et al. |
| 2014/0033853 | A1 | 2/2014 | Kitahara et al. |
| 2016/0089780 | A1 | 3/2016 | Marttinen et al. |
| 2016/0178000 | A1 | 6/2016 | Docimo |
| 2019/0029905 | A1 | 1/2019 | Komatsu |
| 2019/0047161 | A1* | 2/2019 | Noda ................. A61H 1/0274 |

FOREIGN PATENT DOCUMENTS

| | | | |
|---|---|---|---|
| CN | 203757306 U | * | 8/2014 |
| EP | 2 859 998 A1 | | 4/2015 |
| JP | S51-12185 U | | 1/1976 |
| JP | S60-157196 U | | 10/1985 |
| JP | S62-81722 U | | 5/1987 |
| JP | S62-282886 A | | 12/1987 |
| JP | S63-077682 A | | 4/1988 |
| JP | H03-213288 A | | 9/1991 |
| JP | H05-079941 U | | 10/1993 |
| JP | H08-19985 A | | 1/1996 |
| JP | H09-107198 A | | 4/1997 |
| JP | 2005-014105 A | | 1/2005 |
| JP | 2008-023076 A | | 2/2008 |
| JP | 2009-131104 A | | 6/2009 |
| JP | 2010-084842 A | | 4/2010 |
| JP | 2010-255852 A | | 11/2010 |
| JP | 2012-228754 A | | 11/2012 |
| KR | 20080111293 A | * | 12/2008 |
| KR | 20150132771 A | * | 11/2015 |
| WO | WO 2013/062378 A2 | | 5/2013 |

OTHER PUBLICATIONS

CN 203757306 U (Tao Ma) Aug. 6, 2014 (full text). [online] [retrieved on Jan. 24, 2023]. Retrieved from: ProQuest Dialog. (Year: 2014).*
Supplementary European Search Report in corresponding European Application No. EP 17 75 0355, dated Sep. 17, 2019.
Japanese Office Action, JP Patent Application No. 2017-187866, dated Dec. 15, 2020.
Chinese Office Action, Chinese Patent Application No. 201780010911.4 dated Jan. 8, 2021.
Wikipedia contributors. (Jan. 4, 2016). Thrust bearing. In Wikipedia, The Free Encyclopedia. Retrieved 21:13, Sep. 15, 2021, from https://en.wikipedia.org/w/index.php?title=Thrust_bearing&oldid= 698178325 (Year: 2015).

* cited by examiner

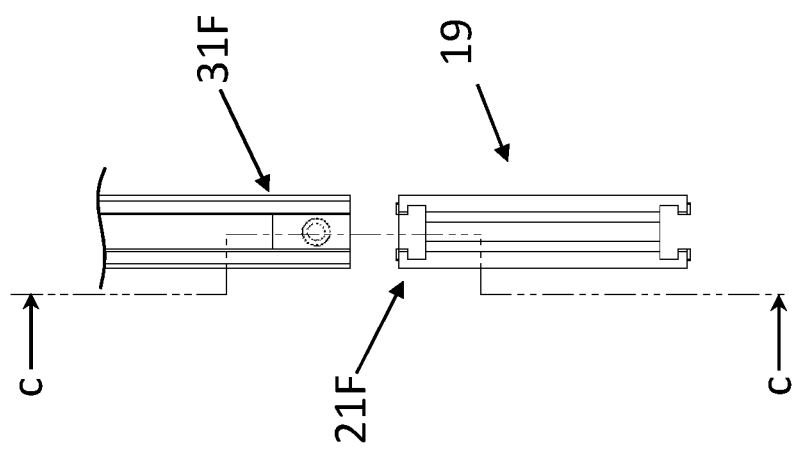

EXTERNALLY-DRIVEN JOINT STRUCTURE

BACKGROUND OF THE INVENTION

Technical Field

The present invention relates to a technique of an externally-driven joint structure.

Background Art

Patent Literature 1 proposes a joint structure of a module-type manipulator. Specifically, the joint structure disclosed in Patent Literature 1 has a built-in motor, and includes attachment faces that can be coupled with another joint structure respectively at two points consisting of a circumferential face and an end face of a rotatable member that rotates in accordance with the rotation of the motor. Accordingly, a plurality of joint structures can be coupled with each other, and thus it is possible to form a manipulator having a multi-joint structure.

Furthermore, Patent Literature 2 proposes a multiaxial joint in which a distal joint part and a proximal joint part are connected such that they can axially pivot and swivel via a rotary pivot joint and a rotary swivel joint that are connected to each other in series. According to this multiaxial joint, it is possible to realize a joint having a high degree of freedom in two directions in a link mechanism of a robot.

CITATION LIST—PATENT LITERATURES

Patent Literature 1: JP S62-282886A
Patent Literature 2: JP 2010-255852A

SUMMARY OF THE INVENTION

Technical Problem

Joint structures that can be used for link mechanisms of robots such as exoskeletal robots or robot arms include joint structures with a built-in actuator (e.g., Patent Literature 1) that are directly coupled with a drive source or that have a built-in drive source, and externally-driven joint structures (e.g., Patent Literature 2) that are disconnected from a drive source and that are driven by an external force transmitted from an external device such as a link member coupled thereto.

Joint structures with a built-in actuator are internally provided with a housing for accommodating an actuator such as a motor for directly driving the joint structures, and thus the size becomes relatively large. Furthermore, their shape, structure, drive direction, and the like are limited due to the built-in actuator. Thus, use situations of the joint structures with a built-in actuator are limited.

Meanwhile, there is no such a limitation on externally-driven joint structures, and thus they can be relatively freely designed according to a link mechanism that is to be formed. Thus, externally-driven joint structures can be used in various situations, and various link mechanisms can be formed using the externally-driven joint structures.

However, conventionally, externally-driven joint structures are in many cases individually designed so as to be optimal for each use situation, and they are seldom modularized. That is to say, externally-driven joint structures that can be used for general purposes have rarely been developed.

An aspect of the present invention has been made in view of these circumstances, and it is an object thereof to provide a modularized externally-driven joint structure that can be used for general purposes.

Solution to Problem

In order to solve the above-described problems, the present invention employs the following configurations.

That is to say, an aspect of the present invention is directed to an externally-driven joint structure including: a shaft member that extends in an axial direction; and a plurality of rotatable members that are arranged along the axial direction, and are coupled with each other by the shaft member in an axially rotatable manner, wherein each of the rotatable members includes a pair of face portions that face each other in the axial direction, a side wall portion that is arranged along outer circumferential edges of the pair of face portions, and at least one coupling portion that is arranged at the face portions or the side wall portion, and is coupled with a link member constituting a link of a robot.

With this configuration, a plurality of rotatable members are coupled with each other in an axially rotatable manner. Moreover, each of the rotatable members includes at least one coupling portion for coupling a link member constituting a link of a robot.

Thus, it is possible to couple a plurality of link members via the joint structure according to the above-described configuration, by coupling different link members with different rotatable members. Furthermore, when the link members are moved by an external force acting from actuators or the like, the rotatable members coupled with the link members can axially rotate in accordance with the rotation of the link members.

That is to say, the joint structure according to the above-described configuration can be driven by an external force transmitted from the link members, and thus it is possible to change a positional relationship between the link members coupled with different rotatable members. Accordingly, with this configuration, it is possible to provide a modularized externally-driven joint structure that can be used for general purposes.

Furthermore, as another mode of the externally-driven joint structure according to the above-described aspect, it is possible that at least one rotatable member of the plurality of rotatable members includes a plurality of the coupling portions arranged at the side wall portion. With this configuration, a plurality of link members can be coupled with a side wall portion of at least one rotatable member, and thus it is possible to realize a complex link mechanism such as a parallel-linked Scott Russell mechanism, which will be described later.

Furthermore, as another mode of the externally-driven joint structure according to the above-described aspect, it is possible that at least one rotatable member of the plurality of rotatable members includes at least one coupling portion arranged at either one of the pair of face portions, and other rotatable members of the plurality of rotatable members include at least one coupling portion arranged at the side wall portion. With this configuration, the link connecting direction can be changed between a link member coupled with a face portion of at least one rotatable member and a link member coupled with a side wall portion of another rotatable member. Accordingly, the link connecting direction can be changed without a special structure, and thus the link mechanism that is to be constructed can be made compact on the whole.

Furthermore, as another mode of the externally-driven joint structure according to the above-described aspect, it is possible that the face portions of the rotatable members are provided with a recess portion with a shape that allows a bearing in the shape of a ring that receives a force that acts in the axial direction to be accommodated between rotatable members that are adjacent to each other in the axial direction. With this configuration, it is possible to provide a modularized joint structure that can be reinforced in the axial direction by a bearing.

Furthermore, as another mode of the externally-driven joint structure according to the above-described aspect, it is possible that an encoder for detecting a relative rotational angle between the rotatable members that are adjacent to each other in the axial direction is further accommodated between the recess portions of the adjacent rotatable members. With this configuration, an encoder for detecting a rotational angle is built in the joint structure. Thus, it is possible to provide a compact and modularized joint structure that can detect an angle.

Furthermore, as another mode of the externally-driven joint structure according to the above-described aspect, it is possible that the recess portions are formed in the shape of a circular ring, bases of inner circumferential faces of the recess portions are provided with a step portion in the shape of a circular ring extending inward in a radial direction from the inner circumferential faces, a face portion of a rotatable member that faces the recess portions, the rotatable member being adjacent to the rotatable members, is provided with a projecting portion in the shape of a circular ring with a diameter smaller than that of the recess portions, a base of an outer circumferential face of the projecting portion is provided with a step portion in the shape of a circular ring extending outward in the radial direction from the outer circumferential face of the projecting portion, and a cross roller bearing as the bearing in the shape of a ring is arranged so as to be supported by the inner circumferential face of the recess portion, a face along the axial direction of the step portion of the recess portion, the outer circumferential face of the projecting portion, and a face along the axial direction of the step portion of the projecting portion. With this configuration, since a cross roller bearing is used, it is possible to increase the outer diameter of the shaft member compared with the case in which a thrust bearing is used. Accordingly, the rigidity of the shaft member can be improved.

Furthermore, as another mode of the externally-driven joint structure according to the above-described aspect, it is possible that the joint structure includes two rotatable members, the coupling portions of the rotatable members are arranged symmetric about the axial direction such that, even when the joint structure is reversed about an axis that is perpendicular to the axial direction, the joint structure can be used while a positional relationship between the link members is maintained, one of the two rotatable members is formed in one piece with the shaft member, the other rotatable member of the two rotatable members has a through hole into which the shaft member is allowed to be inserted, and a radial bearing is arranged so as to be interference-fitted to the shaft member and clearance-fitted to an inner circumferential wall of the through hole, or so as to be clearance-fitted to the shaft member and interference-fitted to the inner circumferential wall of the through hole. With this configuration, it is possible to provide a joint structure that can be applied to situations with different load conditions such as unbalanced loads and stationary loads, because the structure is symmetric about the axial direction.

In this case, the coupling portions can be coupled with the same type of link members. Furthermore, following link mechanisms can be constructed using the joint structure according to this embodiment. That is to say, an aspect of the present invention is directed to a link mechanism including: two or more joint structures according to this embodiment; and a link member that is coupled with the coupling portions of the joint structures, wherein two joint structures that are adjacent to each other via the link member are arranged such that one of the joint structures is used in a state of being reversed about an axis that is perpendicular to the axial direction with respect to the other joint structure so that the rotatable members face each other in the direction that is perpendicular to the axial direction. With this configuration, it is possible to construct a link mechanism that is compact in the width direction.

Furthermore, as another mode of the externally-driven joint structure according to the above-described aspect, it is possible that the joint structure includes two rotatable members, the coupling portions of the rotatable members are arranged symmetric about the axial direction such that, even when the joint structure is reversed about an axis that is perpendicular to the axial direction, the joint structure can be used while a positional relationship between the link members is maintained, the shaft member is formed separately from the two rotatable members, the rotatable members each have a through hole into which the shaft member is allowed to be inserted, and a radial bearing is arranged between the shaft member and the rotatable members so as to be interference-fitted to the shaft member and clearance-fitted to an inner circumferential wall of the through hole, or so as to be clearance-fitted to the shaft member and interference-fitted to the inner circumferential wall of the through hole. With this configuration, it is possible to provide a joint structure that is symmetric about the axial direction.

Furthermore, as another mode of the externally-driven joint structure according to the above-described aspect, it is possible that the joint structure includes three or more rotatable members, and the coupling portions of at least two rotatable members of the three or more rotatable members are coupled with a same link member. With this configuration, one link member is supported by a plurality of rotatable members, and thus an external force that acts from the link member can be dispersed between the rotatable members. Accordingly, with this configuration, even when a relatively large force acts from a link member, deformation of the shaft member of the joint structure can be suppressed.

Furthermore, as another mode of the externally-driven joint structure according to the above-described aspect, it is possible that coupling between the coupling portions and the link member is constituted by a magnet. With this configuration, it is easy to couple the rotatable members and the link member with each other, and thus it is easy to produce a link mechanism.

Furthermore, as another mode of the externally-driven joint structure according to the above-described aspect, it is possible that the rotatable members have at least one coupling portion arranged at the side wall portions, the side wall portions of the rotatable members are formed in the shape of a cylinder, and the coupling portions arranged at the side wall portions have a shape obtained by cutting, in a tangential direction, arc portions of the side wall portions. With this configuration, it is possible to provide a joint structure that can be more easily produced through lathe machining or the like. Note that a side wall portion being in the shape of a cylinder refers to a state in which the outer shape of the side wall portion is cylindrical, except for the portion obtained by cutting for forming the coupling portion.

Furthermore, as another mode of the externally-driven joint structure according to the above-described aspect, it is possible that the side wall portions of the rotatable members have a height that matches a thickness of the link member. With this configuration, it is possible to provide a joint structure that can form a compact link mechanism.

Furthermore, as another mode of the externally-driven joint structure according to the above-described aspect, it is possible that the coupling portions arranged at the side wall portions have a projecting portion projecting outward in the radial direction at a center in the tangential direction, in conformity with a recess portion provided at a center of an end face of the link member. With this configuration, the portion obtained by cutting as a coupling portion in each rotatable member can be arranged on the outer side in the radial direction, and thus it is possible to provide a joint structure in which a bearing with a relatively large diameter can be arranged.

Furthermore, as another mode of the externally-driven joint structure according to the above-described aspect, it is possible that a reinforcing plate for supporting a coupling region of the coupling portion arranged at the side wall portion of the rotatable member and the link member is provided on at least one of both sides in the axial direction of the coupling region. With this configuration, it is possible to provide a joint structure that is unlikely to be broken by twisting.

Furthermore, as another mode of the externally-driven joint structure according to the above-described aspect, it is possible that each of the rotatable members has a plurality of the coupling portions at the side wall portion, and the plurality of coupling portions are arranged symmetric about an axis in each of the rotatable members. With this configuration, it is possible to provide a joint structure that can be used while a positional relationship between the link members is maintained even when the joint structure is axially rotated.

Furthermore, an aspect of the present invention is directed to a link mechanism including: the joint structure according to any one of above-described aspects; and a link member that is coupled with the coupling portion arranged at the side wall portions of the rotatable members of the joint structure, wherein the side wall portions of the rotatable members of the joint structure include a wire-driving groove portion, a fixture is attached to the link member, and a wire that is driven by an external drive source is arranged along the wire-driving groove portion, and the end portion of the wire is fixed to the fixture.

Advantageous Effects of Invention

According to the present invention, it is possible to provide a modularized externally-driven joint structure that can be used for general purposes.

BRIEF DESCRIPTION OF THE DRAWINGS

FIG. 16A schematically shows an example of a joint structure according to another embodiment.

DETAILED DESCRIPTION OF PREFERRED EMBODIMENTS

Hereinafter, an embodiment according to an aspect of the present invention (hereinafter, also described as "the present embodiment") will be described based on the drawings. The present embodiment described below is, however, to be considered in all respects as illustrative of the present invention. It is to be understood that various improvements and modifications can be made without departing from the scope of the present invention. In other words, in implementing the present invention, specific configurations that depend on the embodiment may be employed as appropriate.

§ 1 Configuration Example

Figure 1:
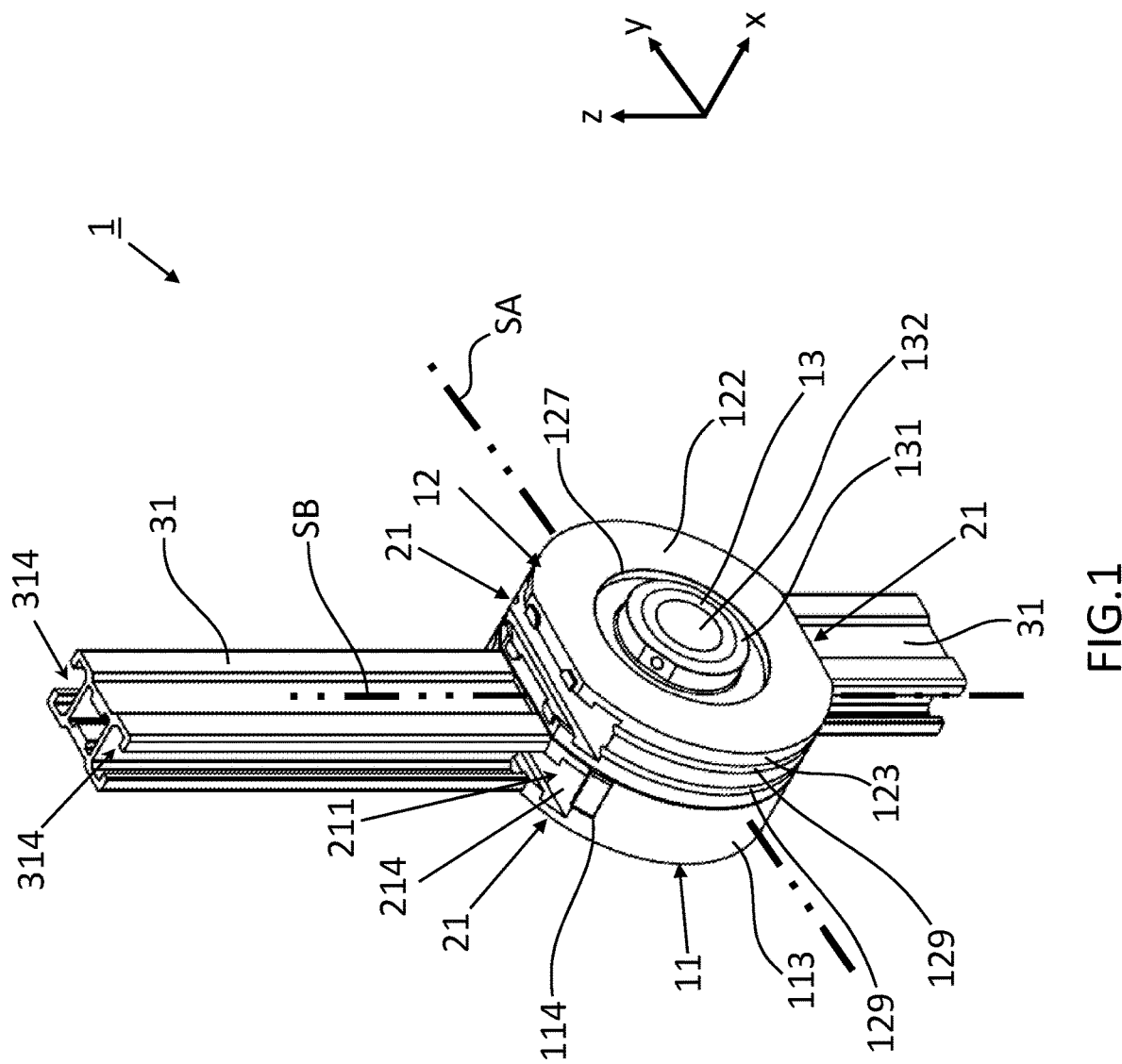
FIG. 1 is a perspective view schematically showing an example of a joint structure according to an embodiment.
Figure 2:
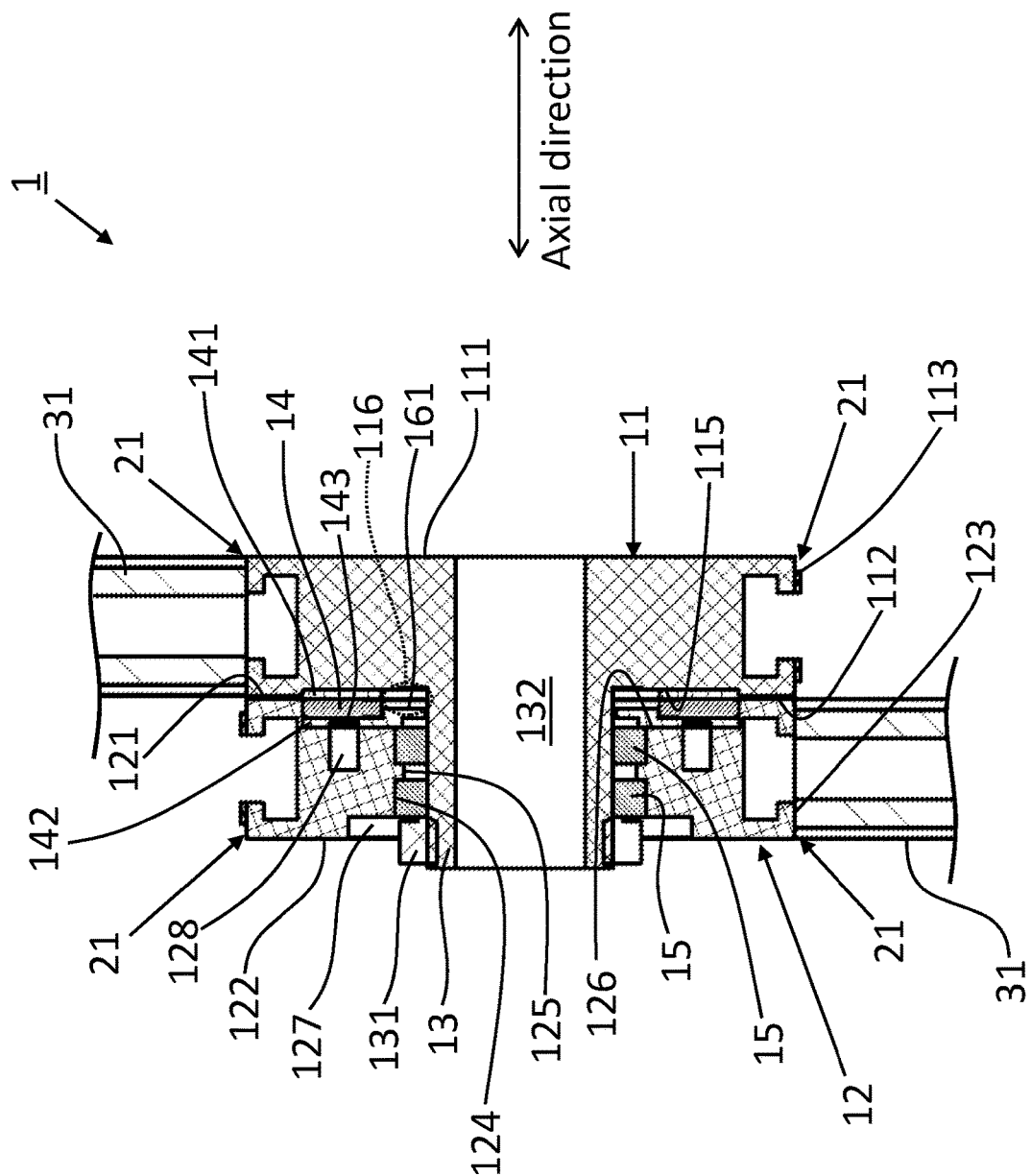
FIG. 2 is a cross-sectional view schematically showing an example of the joint structure according to the embodiment.

First, an externally-driven joint structure 1 according to the present embodiment will be described with reference to FIGS. 1 and 2. FIG. 1 is a perspective view schematically showing an example of the joint structure 1 according to the present embodiment. FIG. 2 is a cross-sectional view schematically showing an example of the joint structure 1 according to the present embodiment. In FIG. 2, hatching is used in order to identify each constituent element. This hatching is for the sake of ease of description, and is not for specifying the material or the like of each constituent element. The same applies to other cross-sectional views using hatching.

As shown as an example in FIGS. 1 and 2, the joint structure 1 according to the present embodiment includes a shaft member 13 that extends in an axial direction (the left-right direction in FIG. 2) and two rotatable members (11 and 12) that are arranged along the axial direction and are rotatably coupled with each other via the shaft member 13. As described later, the joint structure 1 according to the present embodiment does not include a housing for accommodating an actuator such as a motor, and is driven by a separate drive source. Hereinafter, each constituent element will be described. In the description below, for the sake of ease of description, the two rotatable members (11 and 12) are also referred to as a first rotatable member 11 and a second rotatable member 12 respectively. Furthermore, in FIG. 1, for the sake of ease of description, each direction is indicated using an x axis, a y axis, and a z axis. The x axis refers to the axial direction of the shaft member 13, and the y axis and the z axis each refer to an example of a direction that is perpendicular to the axial direction of the shaft member 13.

Shaft Member

First, the shaft member 13 will be described. As shown as an example in FIG. 2, the shaft member 13 according to the present embodiment is formed in one piece with the first rotatable member 11. Specifically, the shaft member 13 is coupled in one piece with the center of a second face portion 112, which will be described later, of the first rotatable member 11, and extends in a direction that is away from the second face portion 112. Accordingly, in the present embodiment, the second rotatable member 12 is coupled with the second face portion 112 side of the first rotatable member 11.

Furthermore, the shaft member 13 according to the present embodiment is formed in the shape of a cylinder, and includes a hollow portion 132 in the shape of a column that extends through the axial direction. The hollow portion 132 is arranged at the center in a direction that is along the radius of the shaft member 13 (hereinafter, it is also referred to as a "radial direction"), and extends in the axial direction through the shaft member 13 and the first rotatable member 11. A male thread (not shown) is formed on the outer circumferential wall of the upper end portion (the end portion on the left side in FIG. 2) of the shaft member 13 such that a fastener 131 (e.g., a nut) in the shape of a circular ring whose inner circumferential wall is provided with a female thread can be attached to the male thread.

Rotatable Members

Next, the rotatable members (11 and 12) will be described. First, the first rotatable member 11 will be described. The first rotatable member 11 according to the present embodiment includes a pair of face portions (111 and 112) that face each other in the axial direction and a side wall portion 113 that is arranged along the outer circumferential edges of the pair of face portions (111 and 112). Hereinafter, for the sake of ease of description, the pair of face portions (111 and 112) are also referred to as a first face portion 111 and a second face portion 112.

In the present embodiment, the face portions (111 and 112) are formed in the shape of a circle, and the height (the length in the left-right direction in FIG. 2) of the side wall portion 113 is slightly shorter than the diameter of each of the face portions (111 and 112). Thus, the first rotatable member 11 is formed in the shape of a cylinder with a low height (length in the left-right direction in FIG. 2). The first face portion 111 arranged on the outer side is formed as a flat face. Meanwhile, the second face portion 112 arranged on the second rotatable member 12 side has a circular ring-like recess portion 115 around the shaft member 13.

Furthermore, in the present embodiment, the side wall portion 113 is provided with two coupling portions 21. Specifically, the two coupling portions 21 are arranged at positions at 180 degrees about the center in the surface direction of the face portions (111 and 112). A Link member 31 constituting a link of a robot such as an exoskeletal robot or a robot arm is coupled with the coupling portions 21. The robot has a link mechanism and includes a machine that is driven at a degree of freedom of 1 or more.

The method for coupling each coupling portion 21 and the link member 31 according to the present embodiment will be described later in detail. Schematically, as shown as an example in FIG. 1, each coupling portion 21 has a groove portion 211 in the shape of an inverted T extending throughout a tangential direction that is perpendicular to the radial direction, and a wedge (a wedge member 32, which will be described later) is attached to the groove portion 211. The link member 31 with a substantially H-shaped cross-section is coupled via the wedges to the coupling portion 21.

Next, the second rotatable member 12 will be described. The second rotatable member 12 according to the present embodiment has substantially the same shape as the first rotatable member 11 excluding the shaft member 13. That is to say, the second rotatable member 12 according to the present embodiment includes a pair of circular face portions (121 and 122) that face each other in the axial direction and a side wall portion 123 that is arranged along the outer circumferential edges of the pair of face portions (121 and 122). The face portions (121 and 122) have the same diameter as the face portions (111 and 112) of the first rotatable member 11, and the side wall portion 123 has the same height (the same length in the axial direction) as the side wall portion 113 of the first rotatable member 11. Furthermore, the side wall portion 123 of the second rotatable member 12 is provided with two coupling portions 21 are arranged at positions at 180 degrees about the center in the surface direction of the face portions (121 and 122).

Contrary to the first rotatable member 11, the second rotatable member 12 has a through hole 124 in the shape of a column that extends through the axial direction, at the center in the surface direction of each of the face portions (121 and 122). The through hole 124 has a diameter that is larger than the outer diameter of the shaft member 13 such that the second rotatable member 12 can be attached to the shaft member 13. Accordingly, the second rotatable member 12 is configured such that, in a state where radial bearings 15 are arranged between the inner circumferential wall of the second rotatable member 12 and the outer circumferential wall of the shaft member 13, the shaft member 13 can be inserted into the through hole 124. The second rotatable member 12 and the first rotatable member 11 are coupled with each other in an axially rotatable manner, by inserting the shaft member 13 into the through hole 124 of the second rotatable member 12, and then attaching the fastener 131 to the upper end portion of the shaft member 13. The side face portions (113 and 123) of the rotatable members (11 and 12) have a shape that is symmetric about a plane perpendicular to the axial direction of the shaft member 13 such that the outer shape of the rotatable members (11 and 12) is bilaterally symmetric. The radial bearings 15 may be interference-fitted to the shaft member 13 and clearance-fitted to the inner circumferential wall of the through hole 124, or may be clearance-fitted to the shaft member 13 and interference-fitted to the inner circumferential wall of the through hole 124.

The radial bearings 15 can receive a force that acts in the radial direction. As shown as an example in FIG. 2, in the present embodiment, two radial bearings 15 are arranged in a line in the axial direction between the inner circumferential wall of the second rotatable member 12 and the outer circumferential wall of the shaft member 13. The inner circumferential wall of the second rotatable member 12 is provided with an interlock projecting portion 125 projecting inward in the radial direction, and the radial bearings 15 are positioned by being interlocked with the interlock projecting portion 125 in the axial direction.

At this time, the inner diameter of the radial bearings 15 is substantially the same as the outer diameter of the shaft member 13, and the fastener 131 prevents the radial bearing 15 arranged on the outer side (the left side in FIG. 2) from being detached from the shaft member 13. Accordingly, the second rotatable member 12 is prevented from being detached from the shaft member 13, via the interlock projecting portion 125 by the radial bearings 15 and the fastener 131. Thus, even when the outer diameter of the fastener 131 is smaller than the diameter of the through hole 124, the second rotatable member 12 can be prevented from being detached. Accordingly, the outer diameter of the fastener 131 may be larger than or smaller than the diameter of the through hole 124.

Furthermore, in the present embodiment, the first face portion 121 arranged on the first rotatable member 11 side is provided with a circular first recess portion 126 corresponding to the recess portion 115 of the second face portion 112 of the first rotatable member 11 that faces the first face portion 121. That is to say, the first recess portion 126 has the same diameter as the recess portion 115, and the first recess portion 126 and the recess portion 115 are positioned adjacent to each other in the axial direction to form a circular ring-like internal space. The first recess portion 126 of the second rotatable member 12 and the recess portion 115 of the first rotatable member 11 respectively correspond to "recess portions" of the present invention. The internal space defined by the first recess portion 126 and the recess portion 115 accommodates a thrust bearing 14 and an encoder 16. The constituent elements accommodated in the internal space will be described later.

Meanwhile, the second face portion 122 is provided with a second recess portion 127 with a diameter that is smaller than the diameter of the first recess portion 126. The diameter of the second recess portion 127 is larger than the outer diameter of the fastener 131. Thus, when using the fastener 131 to prevent detachment of the second rotatable member 12 that has been attached to the shaft member 13, the fastener 131 is prevented from projecting significantly outward (leftward in the drawing) from the second face portion 122 of the second rotatable member 12, by the height (the length in the left-right direction in FIG. 2) of the second recess portion 127.

Furthermore, in the present embodiment, the side wall portion 123 is provided with two wire-driving groove portions 129 that are arranged in a line in the axial direction and each extend in the circumferential direction. Wires for pulling and driving the joint structure 1 are arranged respectively along the wire-driving groove portions 129. The driving by pulling wires will be described later.

The shaft member 13 and the rotatable members (11 and 12) can be produced using a known method such as cutting or injection molding. Furthermore, the shaft member 13 and the rotatable members (11 and 12) can be produced as appropriate using a 3D printer. The material of the shaft member 13 and the rotatable members (11 and 12) may be selected as appropriate according to an embodiment, and examples thereof include metals such as aluminum and titanium and resins such as engineering plastic.

Thrust Bearing and Encoder

Figure 3:
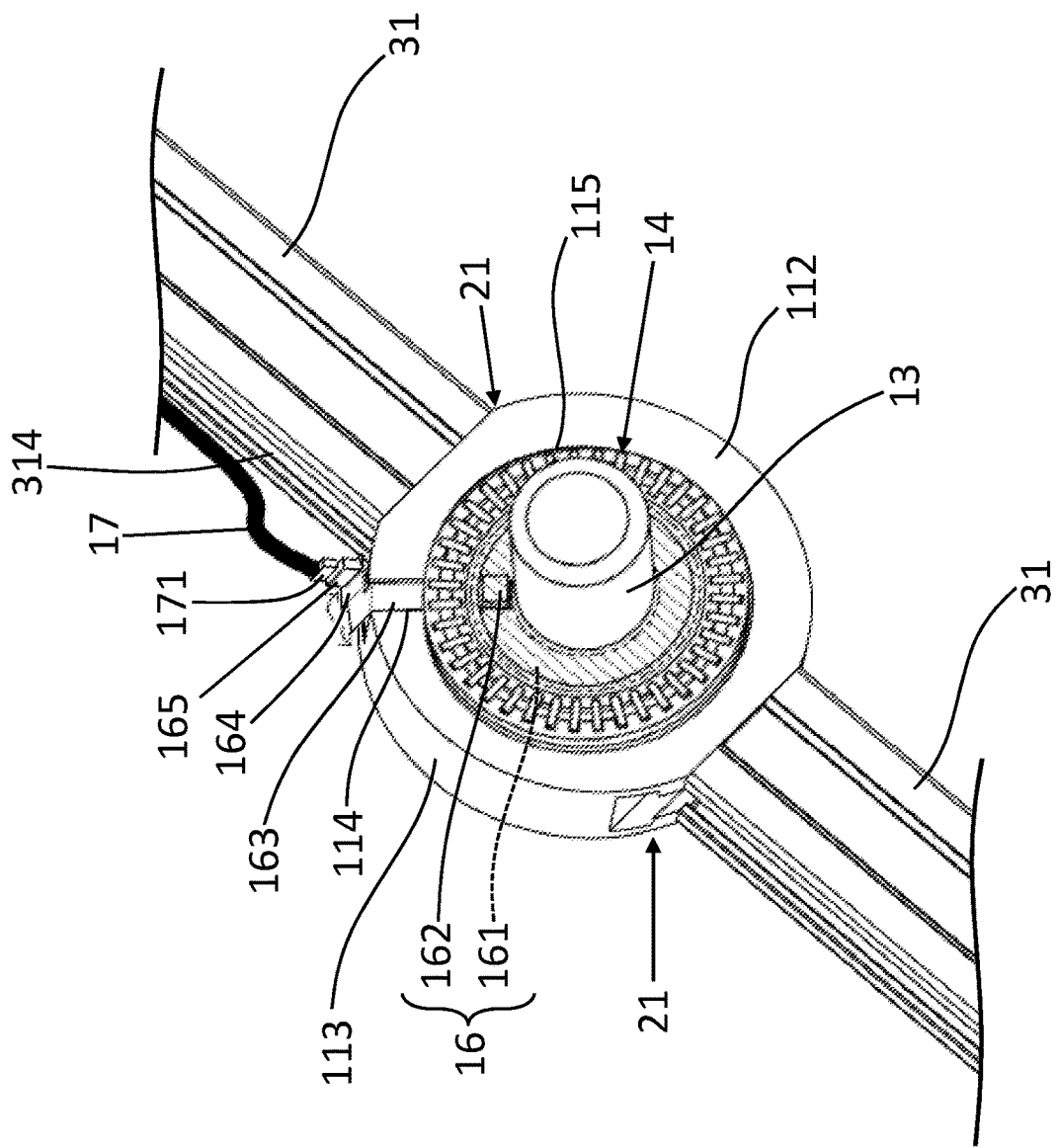
FIG. 3 schematically shows an example of a state in which the joint structure according to the embodiment is exploded.

Next, the constituent elements accommodated in the internal space defined by the recess portions (115 and 126) of the rotatable members (11 and 12) that are adjacent to each other in the axial direction will be described with reference to FIG. 3 as well. FIG. 3 schematically shows an example of a state in which the joint structure 1 according to the present embodiment is exploded. The recess portions (115 and 126) are formed to define a shape that allows the thrust bearing 14 and the encoder 16 to be accommodated, and thus, as described above, the thrust bearing 14 and the encoder 16 are accommodated in the internal space defined by the recess portions (115 and 126).

The thrust bearing 14 can receive a force that acts in the axial direction (the thrust direction). The thrust bearing 14 is generally configured such that a holding unit holding a plurality of rotating components is held between a housing washer and a shaft washer. The type of rotating components of the thrust bearing 14 may be selected as appropriate according to an embodiment, and examples thereof include balls and rollers. However, the type of the thrust bearing 14 is not limited to those including rotating components, and may be those not including rotating components, such as oilless bushes or oilless bearings. The same applies to the radial bearings 15 described above.

As shown as an example in FIG. 2, the thrust bearing 14 is formed in the shape of a ring, and the outer diameter of the thrust bearing 14 is substantially the same as the diameter of each of the recess portions (115 and 126). Meanwhile, the inner diameter of the thrust bearing 14 is larger than the outer diameter of the shaft member 13, and thus a circular ring-like gap portion 116 is formed so as to surround the shaft member 13, between the inner circumferential wall of the thrust bearing 14 and the outer circumferential wall of the shaft member 13.

In the present embodiment, as shown as an example in FIGS. 2 and 3, the gap portion 116 accommodates the encoder 16 capable of detecting a relative rotational angle between the adjacent rotatable members (11 and 12). Specifically, the encoder 16 of the optical reflection type including a scale 161 and a detecting element 162 is accommodated in the gap portion 116. The scale 161 and the detecting element 162 are arranged in the gap portion 116 as follows.

That is to say, as shown as an example in FIG. 2, a circular ring-like plate 142 with the same outer diameter as the thrust bearing 14 is arranged on the second rotatable member 12 side of the thrust bearing 14. The bottom face of the first recess portion 126 of the second rotatable member 12 is provided with a projecting portion 128 projecting toward the first rotatable member 11 side (to the right side in FIG. 2), and the bottom face of the plate 142 is provided with a hole portion 143 corresponding to the projecting portion 128. Thus, the plate 142 is positioned by the projecting portion 128.

As shown as an example in FIG. 2, the inner portion in the radial direction of the plate 142 projects in the shape of a circular ring toward the first rotatable member 11. The outer diameter of the projecting portion is the same as the inner diameter of the thrust bearing 14, and the inner diameter of the projecting portion is substantially the same as or slightly larger than the outer diameter of the shaft member 13. Accordingly, the projecting portion is fitted into the hollow portion of the thrust bearing 14. The circular ring-like scale 161 is attached to the end face of the projecting portion on the first rotatable member 11 side.

Meanwhile, a circular ring-like washer 141 with the same outer diameter and inner diameter as the thrust bearing 14 is arranged on the first rotatable member 11 side of the thrust bearing 14. As shown as an example in FIG. 3, the detecting element 162 of the encoder 16 is arranged between the inner circumferential wall of the washer 141 and the outer circumferential wall of the shaft member 13. Specifically, the detecting element 162 is attached to the bottom face of the recess portion 115 of the first rotatable member 11 that faces the scale 161 in the axial direction.

The scale 161 is concentric with the shaft member 13, and has a surface provided with divisions on which the optical reflectance periodically changes in the circumferential direction. It is possible to detect a relative rotational angle between the adjacent rotatable members (11 and 12), by reading the divisions using the detecting element 162. That is to say, the detecting element 162 is configured as appropriate to be capable of emitting light to the scale 161 and receiving light reflected from the scale 161.

The detecting element 162 outputs an electrical signal according to the received reflected light via a wiring board 163 to the outside. The wiring board 163 is constituted, for example, by a flexible printed circuit (FPC). The wiring board 163 is formed in an L-shape, and has a straight-line portion and a projecting portion 164 projecting from the straight-line portion. As shown as an example in FIG. 3, the end face of the projecting portion 164 is provided with a connector portion 165.

Furthermore, as shown as an example in FIGS. 1 and 3, the first rotatable member 11 is provided with a wiring groove portion 114 with a shape that conforms to the shape of the wiring board 163 such that the wiring board 163 can be extended from the internal space to the outside. The wiring groove portion 114 linearly extends from the second face portion 112 including the recess portion 115 to the side wall portion 113, and has substantially the same length as the straight-line portion of the wiring board 163. Moreover, the portion of the wiring groove portion 114 positioned at the side wall portion 113 is adjacent to the coupling portion 21.

Thus, as indicated by the arrows in FIG. 3, when the straight-line portion of the wiring board 163 is positioned along the wiring groove portion 114, and the projecting portion 164 is bent toward the coupling portion 21, the projecting portion 164 can be arranged at a bottom portion 214 of the groove portion 211 of the coupling portion 21. Accordingly, in the present embodiment, the projecting portion 164 of the wiring board 163 is bonded to the bottom portion 214. That is to say, the connector portion 165 of the wiring board 163 is arranged inside the groove portion 211 of the coupling portion 21.

Accordingly, in the present embodiment, a cable 17 extending from an apparatus that uses data of the rotational angle detected by the detecting element 162 (e.g., a control apparatus for controlling an actuator) can be arranged along groove portions 314 of the link member 31 so as to be coupled with the wiring board 163. That is to say, as shown as an example in FIG. 3, in a state where a cord portion of the cable 17 is fitted into the groove portion 314 of the link member 31, a connector portion 171 of the cable 17 can be coupled with the connector portion 165 of the wiring board 163 in the groove portion 211 of the coupling portion 21.

With this configuration, the encoder 16 can detect a relative rotational angle between the adjacent rotatable members (11 and 12). That is to say, since the plate 142 is positioned by causing the projecting portion 128 of the second rotatable member 12 to be fitted into the hole portion 143, when the second rotatable member 12 axially rotates, the scale 161 axially rotates by the same angle as the axial rotation of the second rotatable member 12. In a similar manner, since the detecting element 162 is attached to the bottom face of the recess portion 115, when the first rotatable member 11 axially rotates, the detecting element 162 axially rotates by the same angle as the axial rotation of the first rotatable member 11. That is to say, the scale 161 and the detecting element 162 relatively rotate axially by the angle of the relative rotation between the first rotatable member 11 and the second rotatable member 12. The end face of the scale 161 is provided with divisions on which the optical reflectance periodically changes in the circumferential direction, and the detecting element 162 can read the divisions (reflected light). Thus, it is possible to specify a relative rotational angle between the adjacent rotatable members (11 and 12), from the output (an electrical signal according to reflected light) of the detecting element 162.

Coupling Portion

Figure 4:
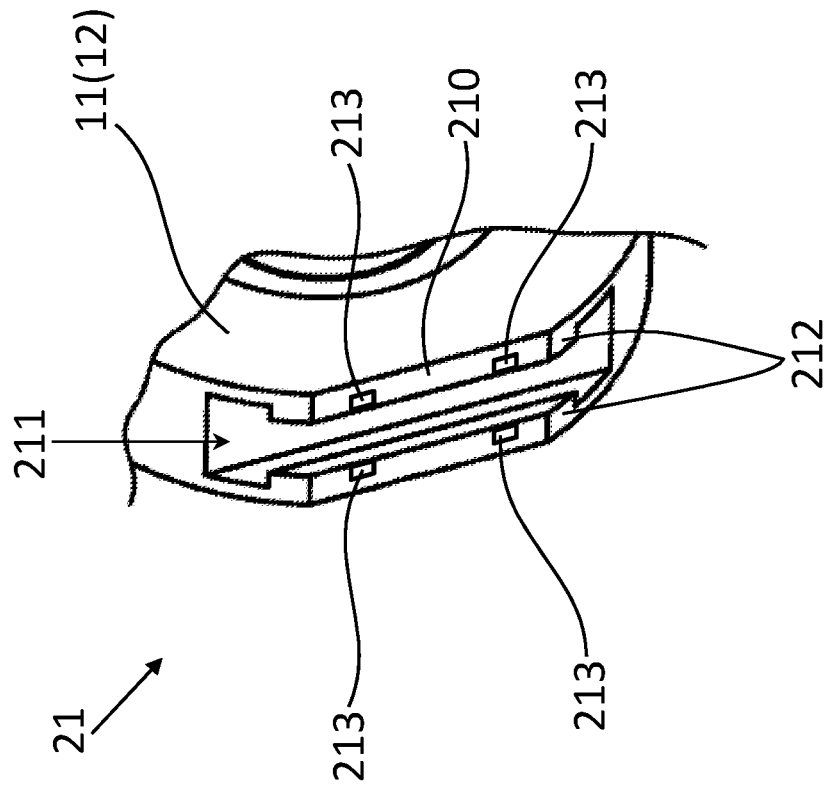
FIG. 4 is a partially enlarged view schematically showing an example of a coupling portion of the joint structure according to the embodiment.
Figure 5A:
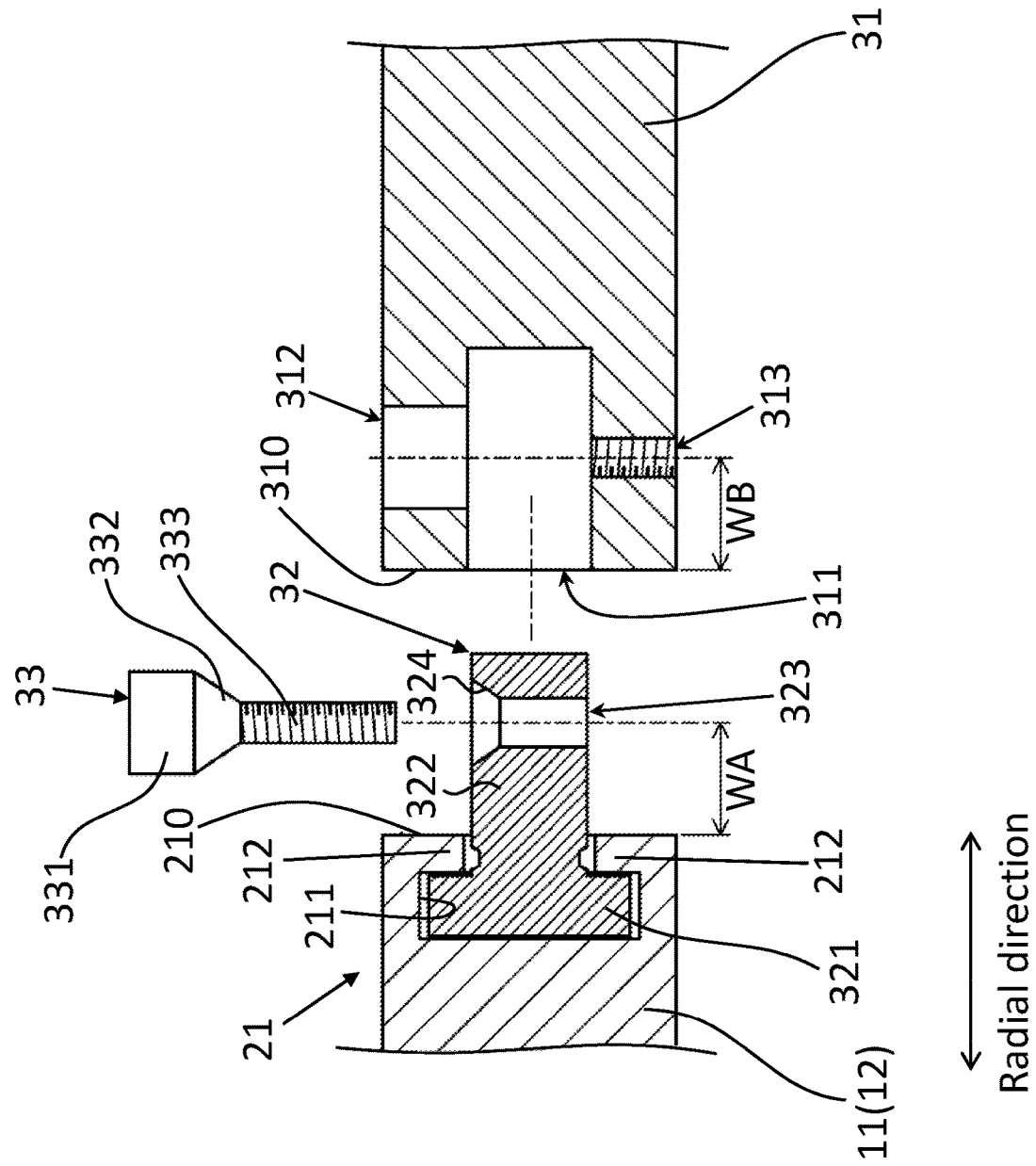
FIG. 5A is a cross-sectional view schematically showing an example of a state before a link member is coupled with the coupling portion of a rotatable member according to the embodiment.
Figure 5B:
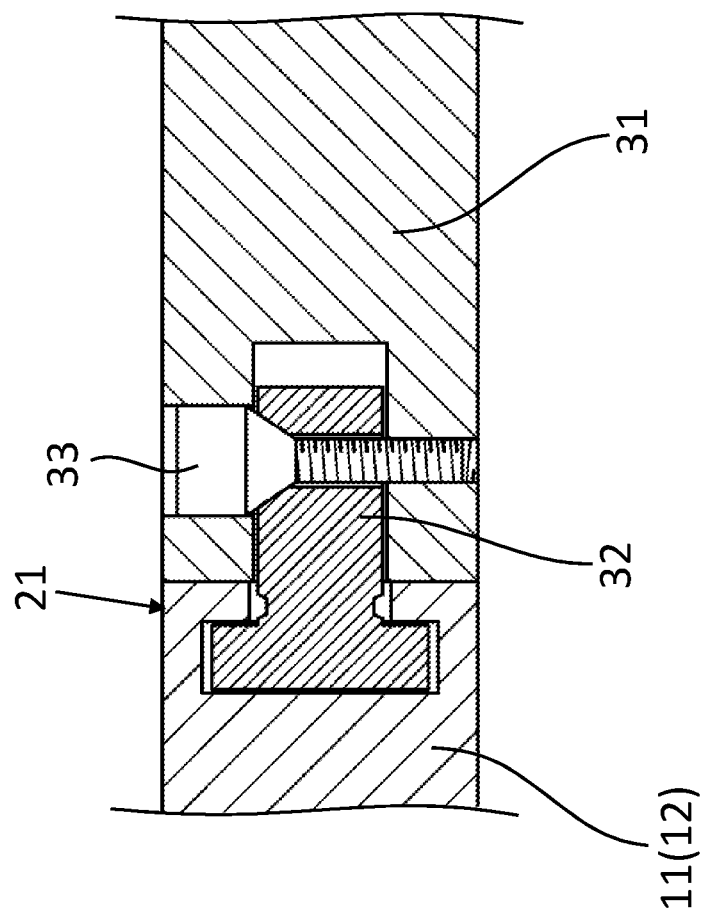
FIG. 5B is a cross-sectional view schematically showing an example of a state after the link member is coupled with the coupling portion of the rotatable member according to the embodiment.
Figure 6:
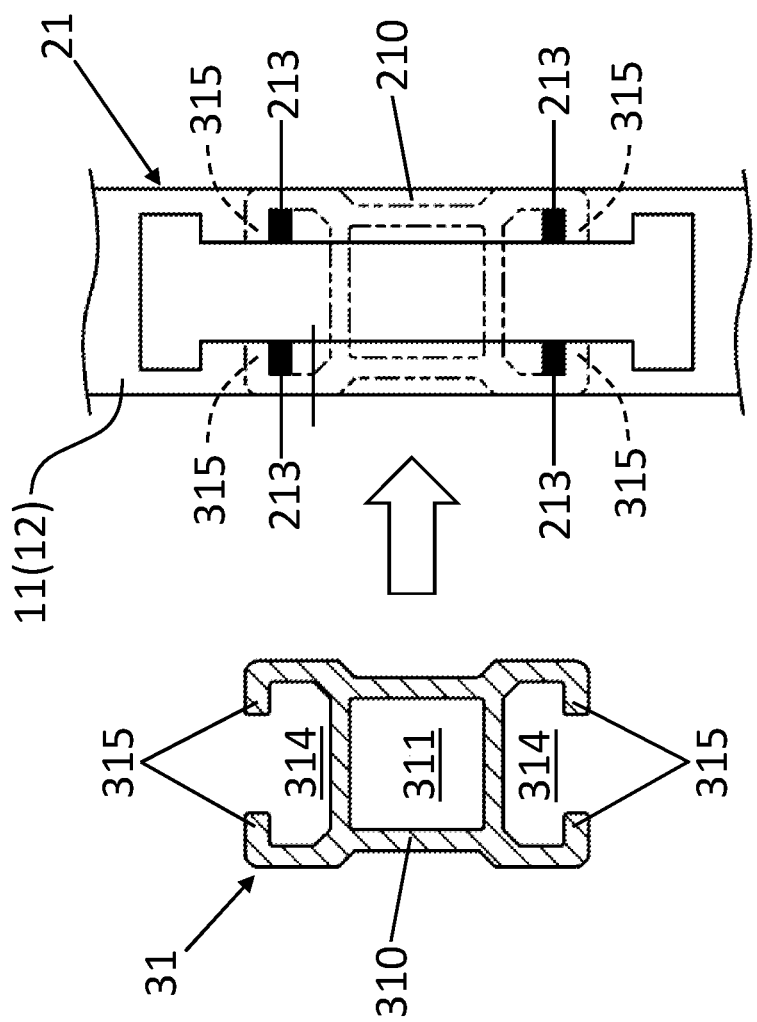
FIG. 6 schematically shows an example of a coupling state between the coupling portion of the rotatable member according to the embodiment and an end face of the link member.

Next, the method for coupling the link member 31 with the coupling portion 21 will be described with reference to FIGS. 4, 5A, 5B, and 6 as well. FIG. 4 is a partially enlarged view schematically showing an example of the coupling portion 21 of the joint structure 1 according to the present embodiment. FIG. 5A is a cross-sectional view schematically showing an example of a state before the link member 31 is coupled with the coupling portion 21. FIG. 5B is a cross-sectional view schematically showing an example of a state after the link member 31 is coupled with the coupling portion 21. FIG. 6 schematically shows an example of a coupling state between an end face 210 of the coupling portion 21 and an end face 310 of the link member 31.

As shown as an example in FIGS. 1 and 4, the coupling portions 21 according to the present embodiment each have a shape obtained by cutting, in the tangential direction, an arc portion of the side wall portion (113 or 123) of the rotatable member. Specifically, the coupling portions 21 of the rotatable members (11 and 12) each have an end face 210 that is flat and perpendicular to the radial direction, and the groove portion 211 is formed inward in the radial direction from the end face 210. The groove portion 211 extends through a tangential direction that is perpendicular to the radial direction, and thick-wall portions 212 projecting inward are respectively provided at the upper ends of a pair of groove walls of the groove portion 211. Accordingly, the groove portion 211 is formed to have a substantially inverted T-shaped cross-section. Note that the end face 210 is provided with four rectangular protruding portions 213 projecting outward in the radial direction.

Meanwhile, as shown as an example in FIGS. 1 and 6, the link member 31 according to the present embodiment is provided with the groove portions 314 that are respectively along both side face portions in the longitudinal direction. Accordingly, the link member 31 is formed to have a substantially H-shaped cross-section. Since edge portions 315 of a pair of groove walls constituting each groove portion 314 both project inward, the groove portion 314 is formed to have a substantially inverted T-shaped cross-section. Furthermore, as shown as an example in FIGS. 5A and 5B, the link member 31 has, at the center on its flat end face 310, a hole portion 311 extending in the longitudinal direction from the end face 310. The link member 31 is a frame member made of, for example, a metal such as aluminum or titanium or a resin such as engineering plastic. However, the material of the link member 31 does not have to be limited to these, and may be selected as appropriate according to an embodiment.

In the present embodiment, as shown as an example in FIGS. 5A and 5B, the coupling portion 21 and the link member 31 are coupled to each other via the wedge member 32 as follows. That is to say, the wedge member 32 includes a rectangular head portion 321 with substantially the same size as the wide-width portion of the groove portion 211 of the coupling portion 21, and a rectangular body portion 322 with substantially the same size as the narrow-width portion of the groove portion 211. Accordingly, the wedge member 32 is formed to have a substantially T-shaped cross-section.

The wedge member 32 is arranged such that the head portion 321 is fitted into the groove portion 211 of the coupling portion 21. Accordingly, as shown as an example in FIG. 5A, the wedge member 32 is interlocked with the thick-wall portions 212 of the groove portion 211 of the head portion 321, and the body portion 322 project out of the groove portion 211. The portion projecting out of the groove portion 211 of the body portion 322 is provided with a through hole 323 in the shape of a column with a diameter that is slightly larger than the diameter of a male thread portion 333 of a screw 33 such that the screw 33 can be inserted thereinto. Furthermore, the side of the through hole 323 for receiving the screw 33 is provided with a tapered portion 324 that conforms to a tapered portion 332 of the screw 33.

In conformity with the through hole 323, the link member 31 is provided with a through hole 312 that extends in the width direction (the upper-lower direction in FIGS. 5A and 5B) from the upper face in the drawings to the hole portion 311, and a through hole 313 that extends in the width direction from the hole portion 311 to the lower face in the drawings. In the present embodiment, the through hole 312 has a diameter that is substantially the same as the outer diameter of a head portion 331 of the screw 33, in order to allow the screw 33 to be inserted from the through hole 312 side. Furthermore, the through hole 313 has a diameter that is substantially the same as the outer diameter of the male thread portion 333 of the screw 33, and the inner circumferential wall thereof is provided with a female thread into which the male thread portion 333 is to be screwed. Accordingly, as shown as an example in FIG. 5B, the coupling portion 21 and the link members 31 can be coupled with each other, by fitting the head portion 321 of the wedge member 32 into the groove portion 211 of the coupling portion 21, inserting the body portion 322 into the hole portion 311 of the link member 31, and fastening the screw 33.

Here, a distance WA from the end face 210 of the coupling portion 21 to the through hole 323 in a state where the head portion 321 of the wedge member 32 is fitted into the groove portion 211 is slightly shorter than a distance WB from the end face 310 of the link member 31 to the through hole 313 into which the male thread portion 333 of the screw 33 is screwed. Thus, when screwing the male thread portion 333 of the screw 33 into the through hole 313, the tapered portion 332 of the screw 33 comes into contact with the tapered portion 324 of through hole 323 of the wedge member 32 and pulls the wedge member 32 toward the link member 31.

Accordingly, the wedge member 32 is tensioned in the radial direction (the left-right direction in the drawing), and, due to this tension, the coupling portion 21 and the link member 31 are firmly coupled with each other. Specifically, the coupling portion 21 and the link member 31 are coupled with each other in the radial direction due to a force that acts from the head portion 321 of the wedge member 32 to the thick-wall portions 212 of the coupling portion 21 and a force that acts from the screw 33 via the through hole 323 of the wedge member 32 to the inner circumferential walls of the through holes (312 and 312) of the link member 31. At this time, the link member 31 is coupled with the coupling portion 21 such that the link member 31 extends along the radial direction of the rotatable members (11 and 12), that is, such that the radial direction of the rotatable members (11 and 12) matches the longitudinal direction of the link member 31. In the present embodiment, the link member 31 can be coupled with the coupling portion 21 of each of the rotatable members (11 and 12) through such simple fastening using the wedge member 32 and the screw 33.

However, in the present embodiment, since the groove portion 211 of the coupling portion 21 extends throughout a tangential direction (direction that is perpendicular to the section of the diagram in FIGS. 5A and 5B) that is perpendicular to the radial direction, the wedge member 32 may move in the tangential direction, and the head portion 321 may be detached from the groove portion 211 in the tangential direction. Thus, in the present embodiment, the end face 210 of the coupling portion 21 is provided with the four protruding portions 213.

Specifically, as shown as an example in FIG. 6, the four protruding portions 213 are arranged at four corners of a rectangle so as to be interlocked with the edge portions 315 of the link member 31. Accordingly, in a state where the coupling portion 21 and the link member 31 are coupled with each other, the edge portions 315 of the link member 31 are interlocked with the protruding portions 213, and thus movement in the tangential direction (the upper-lower direction in FIG. 6) of the wedge member 32 for coupling the coupling portion 21 and the link members 31 can be suppressed. Furthermore, the protruding portions 213 are in contact with the link member 31 also in the axial direction, wobbling of the link member 31 in the axial direction can be suppressed. Furthermore, in the present embodiment, the protruding portions 213 conform to the shape near the edge portions 315 of the link member 31, and thus the protruding portions 213 can be used for positioning of the link member 31.

As shown as an example in FIGS. 2, 5A, and 5B, the thickness of each of the rotatable members (11 and 12) according to the present embodiment, in other words, the height of each of the side wall portions (113 and 123) is the same as the thickness (the length in the left-right direction in FIG. 2) of each of the link members 31. Accordingly, when the rotatable members (11 and 12) rotate, the link members 31 coupled with the rotatable members (11 and 12) do not interfere with each other. Note that "the same" refers not only to a state in which the thickness of each of the rotatable members (11 and 12) is completely the same as the thickness of each of the link members 31 but also to a state in which the thickness of each of the rotatable members (11 and 12) is larger than the thickness of each of the link members 31 to the extent that they do not interfere with each other or later-described reinforcing plates 51 can be arranged.

§ 2 Usage Example

Various link mechanisms can be constructed using the joint structure 1 according to the present embodiment. Hereinafter, three examples are shown.

Scott Russell Mechanism

Figure 7A:
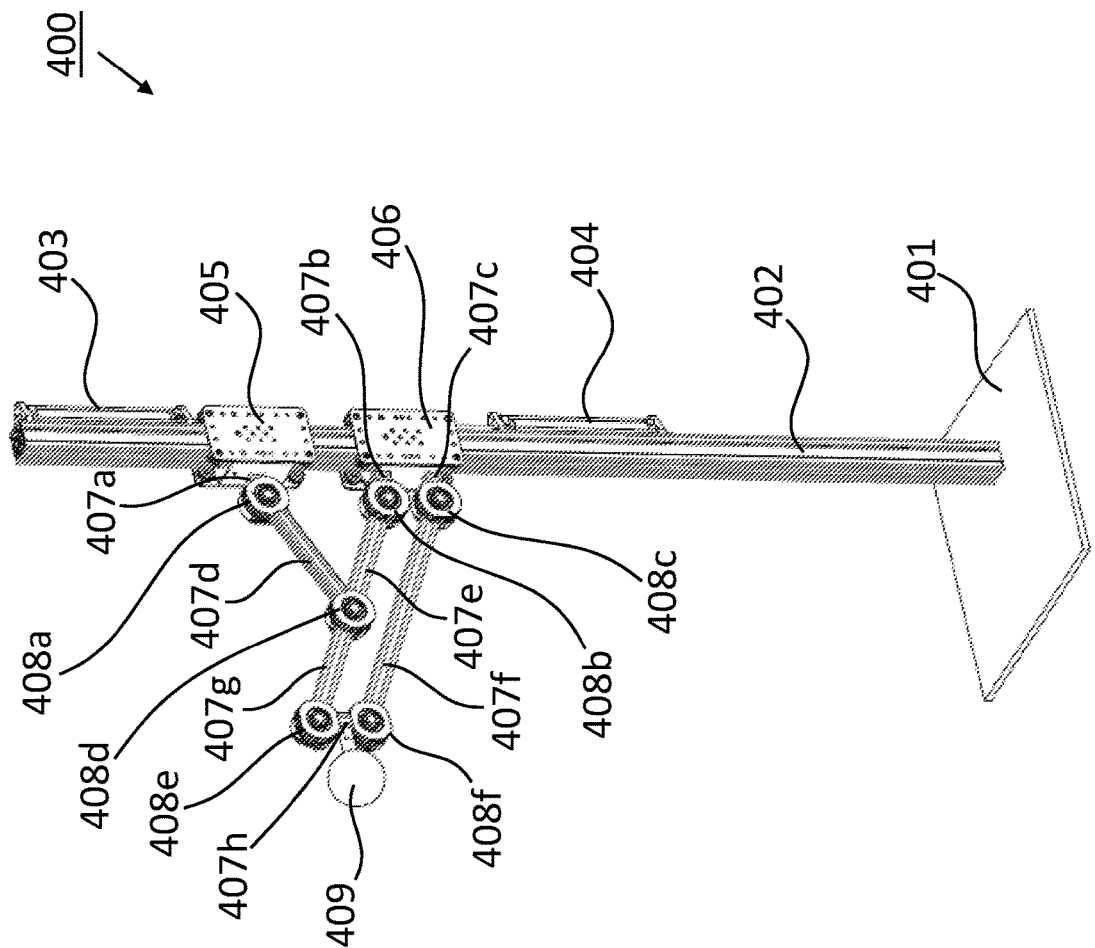
FIG. 7A is a perspective view schematically showing an example of a robot (Scott Russell mechanism) using the joint structure according to the embodiment.
Figure 7B:
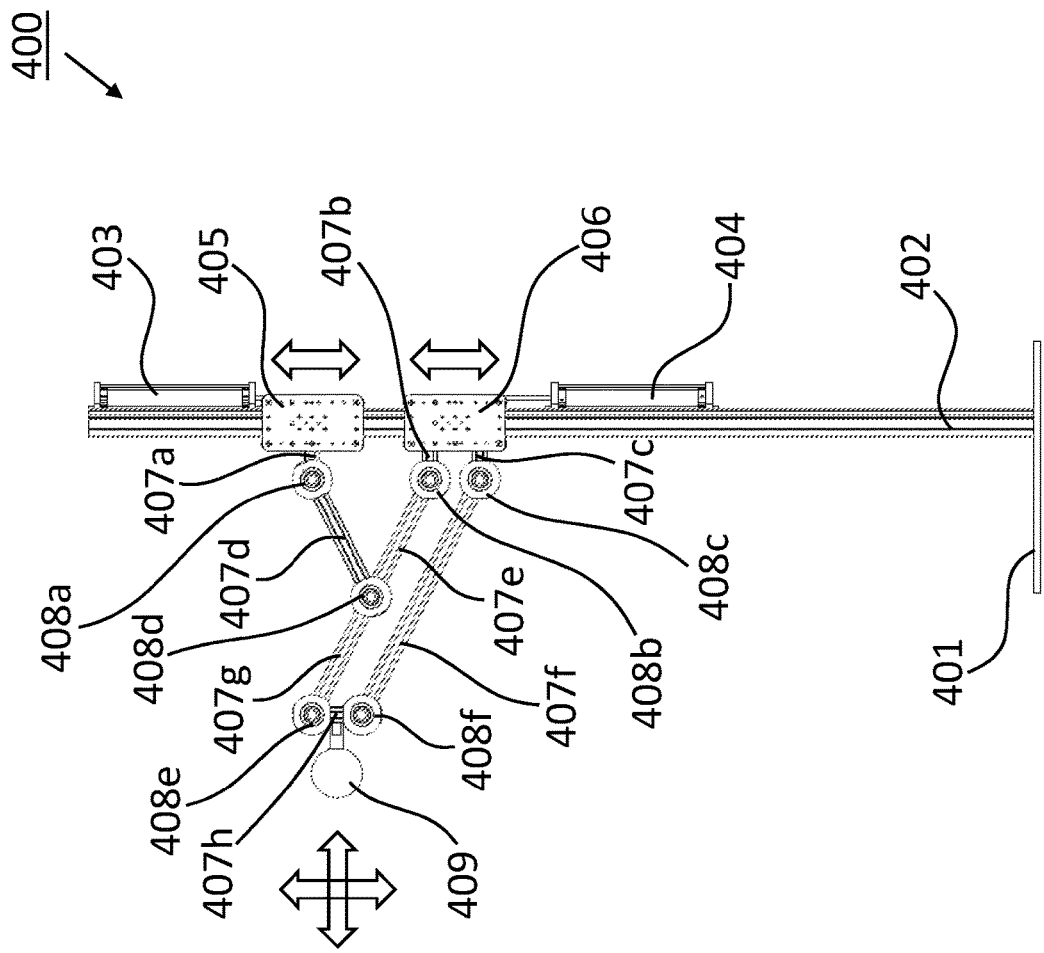
FIG. 7B is a side view schematically showing an example of the robot (Scott Russell mechanism) using the joint structure according to the embodiment.

First, an example of constructing a robot 400 having parallel-linked Scott Russell mechanism using six joint structures 408a to 408f will be described with reference to FIGS. 7A and 7B. FIGS. 7A and 7B are a perspective view and a side view schematically showing an example of the robot 400 according to this usage example. Note that the joint structures are denoted by reference numerals 408a to 408f merely for the sake of ease of description, and the joint structures 408a to 408f correspond to the joint structure 1 described above. The joint structures 408a to 408f are arranged such that the second rotatable member is on the front side in the section of the diagrams. In a similar manner, the link members are denoted by reference numerals 407a to 407h merely for the sake of ease of description, and the link members 407a to 407h correspond to the link members 31 described above.

The robot 400 according to this usage example includes a rectangular base 401 that is placed on the ground, and a support 402 in the shape of a rectangular column extending in the vertical direction from the upper face of the base 401. A pair of actuators (403 and 404) are attached to the support 402 so as to be spaced from each other in the upper-lower direction. Furthermore, two movable portions (405 and 406) are attached so as to be movable (slidable) in the upper-lower direction between the pair of actuators (403 and 404).

The actuators (403 and 404) drive output rods in the vertical direction, thereby moving the movable portions (405 and 406) in the upper-lower direction. Specifically, the actuator 403 arranged on the upper side moves the movable portion 405 in the upper-lower direction, and the actuator 404 arranged on the lower side moves the movable portion 406 in the upper-lower direction. That is to say, the movable portions (405 and 406) can move in the upper-lower direction independently of each other.

Note that the type of the actuators (403 and 404) may be selected as appropriate according to an embodiment as long as the output rods can be moved in the vertical direction. For example, linear actuators, electric actuators, hydraulic actuators, pneumatic actuators, hybrid actuators, or the like may be used as the actuators (403 and 404). Furthermore, the type of the movable portions (405 and 406) may be selected as appropriate according to an embodiment as long as they can move in the upper-lower direction. For example, linear bearings may be used as the movable portions (405 and 406).

A link member 407a extending in the horizontal direction is attached to the movable portion 405. In a similar manner, two link members (407b and 407c) extending in the horizontal direction are attached to the movable portion 406 so as to be spaced from each other in the upper-lower direction. The link members 407a to 407c are formed as short members.

A joint structure 408a is attached to the end portion of the link member 407a on the side opposite to the movable portion 405. Specifically, the link member 407a is coupled with a coupling portion of the first rotatable member of the joint structure 408a. Furthermore, a link member 407d that is longer in the longitudinal direction than the link member 407a is coupled with a coupling portion of the second rotatable member of the joint structure 408a.

Meanwhile, the end portion of the link member 407b on the side opposite to the movable portion 406 is coupled with a coupling portion of the second rotatable member of the joint structure 408b. Furthermore, a link member 407e that is longer in the longitudinal direction than the link member 407b is coupled with a coupling portion of the first rotatable member of the joint structure 408b.

The link members (407d and 407e) are coupled with a joint structure 408d. Specifically, the link member 407e is coupled with a coupling portion of the first rotatable member of the joint structure 408d, and the link member 407d is coupled with a coupling portion of the second rotatable member. Furthermore, a link member 407g with a length similar to that of the link member 407e is coupled with another coupling portion of the first rotatable member of the joint structure 408d.

Accordingly, the Scott Russell mechanism is constituted by the three joint structures (408a, 408b, and 408d) and the five link members (407a, 407b, 407d, 407e, and 407g). The end portion of the link member 407g on the side opposite to the joint structure 408d is coupled with a coupling portion of the first rotatable member of a joint structure 408e. Furthermore, a link member 407h with a length that is the same as the distance in the upper-lower direction between the two joint structures (408b and 408c) adjacent to the movable portion 406 is coupled with a coupling portion of the second rotatable member of the joint structure 408e. The end portion of the link member 407h on the side opposite to the joint structure 408e is coupled with a coupling portion of the second rotatable member of the joint structure 408f. A front end portion 409 such as an end effector is attached to the link member 407h.

Meanwhile, the end portion of the link member 407c arranged below the link member 407b, on the side opposite to the movable portion 406, is coupled with a coupling portion of the second rotatable member of the joint structure 408c. Furthermore, a link member 407f with a length that is the same as the total length of the two link members (407e and 407g) and the joint structure 408d arranged above is coupled with a coupling portion of the first rotatable member of the joint structure 408c. The end portion of the link member 407f on the side opposite to the joint structure 408c is coupled with a coupling portion of the first rotatable member of the joint structure 408f.

That is to say, in the robot 400, the pair of link members (407e and 407g) are parallel to the link member 407f, the links connecting the four joint structures (408b, 408c, 408f, and 408e) form a parallelogram (parallel link). Thus, due to the characteristics of the Scott Russell mechanism, the robot 400 can move the front end portion 409 in the upper-lower and front-rear directions (the arrow directions in FIG. 7B), by driving the actuators (403 and 404) and moving the movable portions (405 and 406) in the upper-lower direction. Moreover, due to the characteristics of the parallel link, the robot 400 can keep the front end portion 409 horizontal even when driving the actuators (403 and 404) and moving the front end portion 409 attached to the link member 407h in the upper-lower and front-rear directions.

Note that, in the robot 400, two coupling portions of the same rotatable member are simultaneously used only in the joint structure 408*d*. That is to say, two coupling portions of the first rotatable member of the joint structure 408*d* are used to linearly couple the two link members (407*e* and 408*g*). On the other hand, only one coupling portion is used to couple the link members in the rotatable members of the other joint structures. Thus, it is sufficient that the rotatable members of the other joint structures each have at least one coupling portion, and the other coupling portions may be omitted. Furthermore, the rotatable members that are coupled by the link members do not have to be limited to the examples described above, and may be selected as appropriate according to an embodiment.

As described above, if two or more coupling portions are provided on a side wall portion of at least one rotatable member, the robot 400 having parallel-linked Scott Russell mechanism can be constructed. Thus, it is possible to realize a complex link mechanism such as a parallel-linked Scott Russell mechanism as described above by arranging a plurality of coupling portions on a side wall portion of at least one rotatable member among the plurality of rotatable members.

Wire Driving Mechanism

Figure 8:
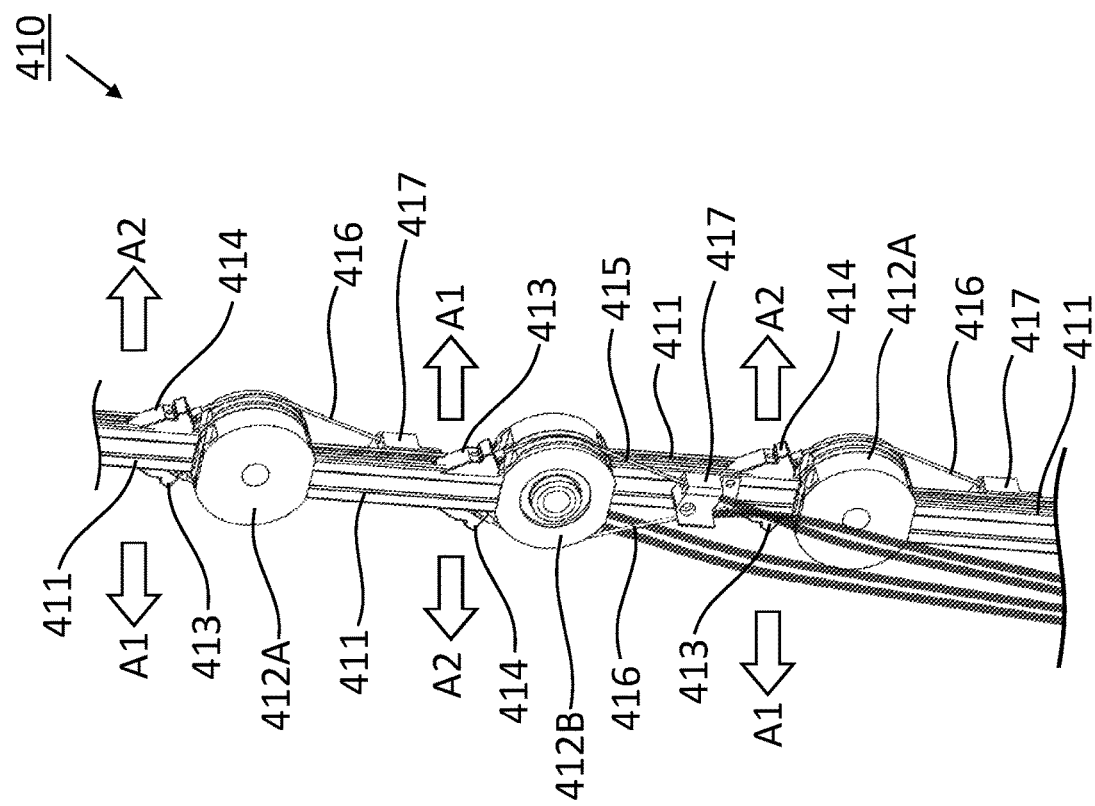
FIG. 8 is a perspective view schematically showing an example of a robot (wire driving mechanism) using the joint structure according to the embodiment.

Next, an example of driving the joint structure 1 by wires using the wire-driving groove portions 129 will be described with reference to FIG. 8. FIG. 8 is a perspective view schematically showing an example of a robot 410 having three joint structures 412 that are driven by pulling wires. As in the foregoing example, the joint structures are denoted by reference numerals 412A and 412B merely for the sake of ease of description, and the joint structures (412A and 412B) correspond to the joint structure 1 described above. Specifically, the joint structure using the first rotatable member 11 on the front side in the section of the diagram is denoted by "412A", and the joint structure using the second rotatable member 12 on the front side in the section of the diagram is denoted by "412B". Hereinafter, they will be simply referred to as "joint structures 412" if they are not to be distinguished from each other. In a similar manner, the link members are denoted by a reference numeral 411 merely for the sake of ease of description, and the link members 411 correspond to the link members 31 described above.

In the robot 410 according to this usage example, four link members 411 are coupled by the three joint structures 412. The link members 411 are as appropriate coupled with coupling portions of the joint structures 412. Specifically, the first rotatable member of the joint structure 412B and the second rotatable member of the joint structure 412A arranged below the joint structure 412B are coupled with each other via the link member 411. Furthermore, the second rotatable member of the joint structure 412B and the first rotatable member of the joint structure 412A arranged above the joint structure 412B are coupled with each other via the link member 411. Above each of the joint structures 412, a pair of fixtures (413 and 414) are fixed to the groove portions of the link member 411.

End portions of the wires (415 and 416) are fixed to the fixtures (413 and 414). Specifically, an end portion of the wire 415 is fixed to the fixture 413 and an end portion of the wire 416 is fixed to the fixture 414. The wires (415 and 416) are Bowden cables that are arranged along the wire-driving groove portions 129 and are then allowed to pass through binding members 417 arranged below the respective joint structures 412 so as to be coupled with a drive source provided outside. The drive source is, for example, a pneumatic actuator, a motor, or the like.

The thus configured robot 410 according to this usage example operates as follows. That is to say, when the wire 415 is pulled by the external drive source, the force acts on the fixture 413, and the link member 411 above the joint structure 412 that is to be driven is pulled in the arrow A1 direction. Accordingly, the rotatable member coupled with the link member 411 rotates. In a similar manner, when the wire 416 is pulled by the external drive source, the force acts on the fixture 414, and the link member 411 above the joint structure 412 that is to be driven is pulled in the arrow A2 direction. Accordingly, the rotatable member coupled with the link member 411 rotates. The robot 410 according to this usage example can drive the joint structures 412 by pulling wires in this manner.

In this usage example, each joint structure 412A is used in a state of being reversed about an axis perpendicular to the axial direction with respect to the joint structure 412B. The first rotatable member of the joint structure 412B and the second rotatable member of the joint structure 412A arranged below the joint structure 412B are coupled with each other via the link member 411. The second rotatable member of the joint structure 412B and the first rotatable member of the joint structure 412A arranged above the joint structure 412B are coupled with each other via the link member 411. Accordingly, two joint structures (412A and 412B) adjacent to each other via the link member 411 are arranged such that the rotatable members face each other in the direction that is perpendicular to the axial direction. Thus, the robot 410 according to this usage example is compact in the axial direction. However, the use state of the joint structures for making the link mechanism compact in the axial direction is not limited to the foregoing example. For example, as in the robot 400 described above, adjacent two joint structures may be used in a state of being oriented in the same direction. In this case, the radial bearings may be transition-fitted with slight gap provided at the shaft members and the inner walls of the through holes instead of being interference-fitted to any of the shaft members and the inner walls of the through holes. With this configuration, since adjacent two joint structures are used in a state of being oriented in the same direction, fasteners and the like can be arranged in one direction. Accordingly, it is possible to construct a link mechanism in which the joint structures can be subjected to maintenance operations from one direction even when grease up of bearings or adjustment of pressurization is needed.

Delta Robot

Figure 9A:
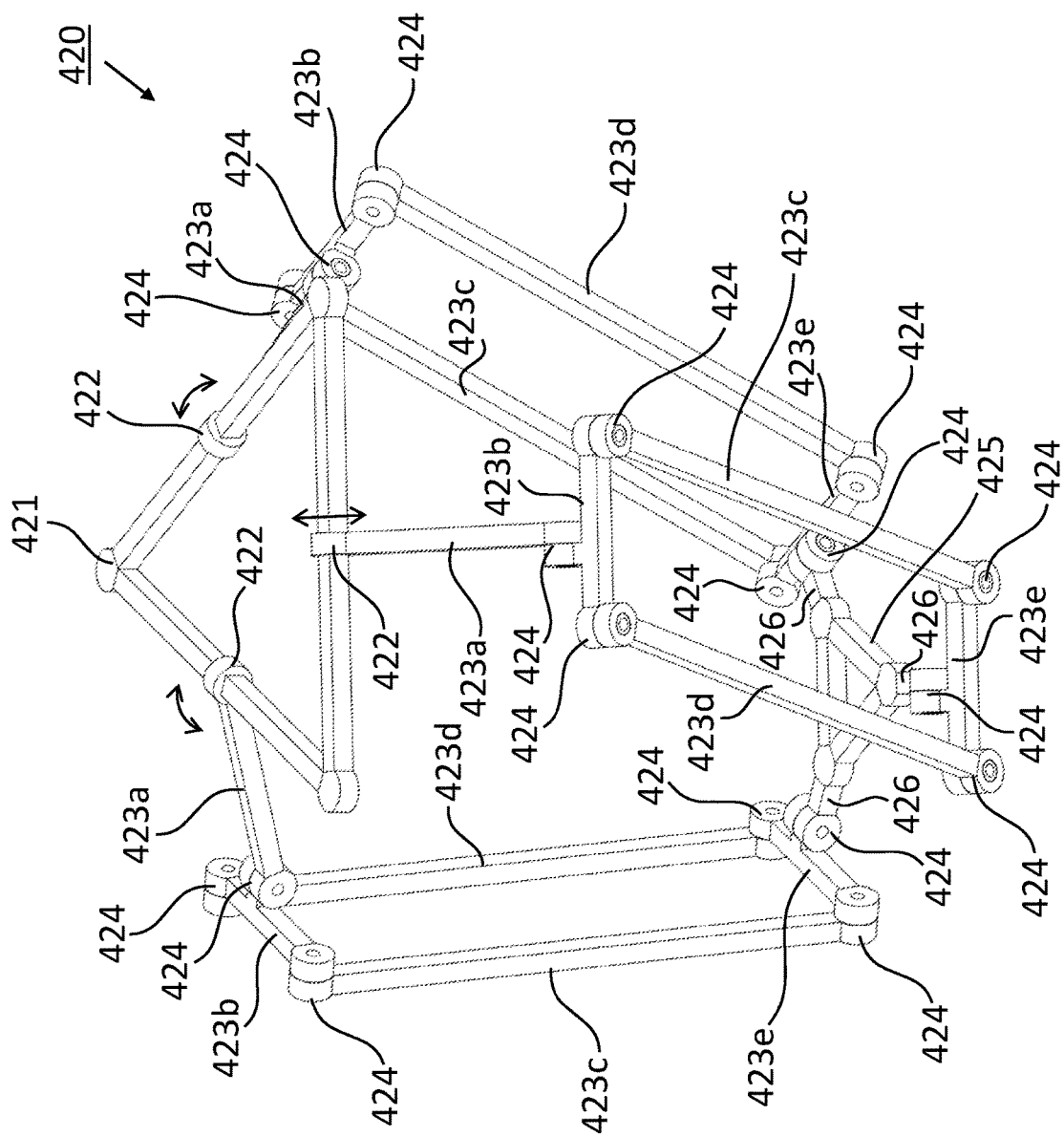
FIG. 9A is a perspective view schematically showing an example of a robot (delta robot) using the joint structure according to the embodiment.

Next, an example of constructing a delta robot 420 having parallel link mechanisms at three points through 18 joint structures 424 will be described with reference to FIG. 9A. FIG. 9A is a perspective view schematically showing an example of the delta robot 420 according to this usage example. As in the foregoing example, the joint structures denoted by a reference numeral 424 merely for the sake of ease of description, and the joint structures 424 correspond to the joint structure 1 described above.

The delta robot 420 according to this usage example has a base portion 421 in the shape of a triangular frame. A rotary motor 422 is attached to the center of each side of the base portion 421, and the rotary motor 422 is coupled with a link member 423*a*. The link member 423*a* corresponds to the link member 31 described above.

The joint structure 424 is coupled with the other end portion of the link member 423*a*. A T-shaped link member 423*b* is coupled with the joint structure 424. A parallel link is constituted by the link member 423*b* together with four joint structures 424, two link members (423c and 423d) with the same length, and a T-shaped link member 423e.

The link members (423c and 423d) correspond to the link members 31 described above. Furthermore, the end portions of the T-shaped link members (423b and 423e) have a configuration similar to that of the end portions of the link members 31. The T-shaped link members (423b and 423e) can be each produced, for example, by welding or bonding two link members 31 as appropriate. The link members 423a to 423e are coupled with the coupling portions of the joint structures 424 as appropriate.

Furthermore, the remaining end portion of the T-shaped link member 423e is also coupled with joint structures 424, and a front end portion 425 in the shape of a triangular frame is attached to the three joint structures 424 in total arranged lowermost. Specifically, the corners of the front end portion 425 are respectively provided with link portions 426 with a configuration similar to that of the end portions of the link members 31, and the front end portion 425 are coupled with the joint structures 424 respectively via the link portions 426.

The thus configured delta robot 420 according to this usage example operates as follows. That is to say, in the delta robot 420 according to this usage example, parallel link mechanisms are respectively coupled with the three rotary motors 422 arranged at the base portion 421. Thus, if all or a part of the three rotary motors 422 are driven, the parallel link mechanisms coupled with the driven rotary motors 422 can be moved in the upper-lower direction, and thus it is possible to move the front end portion 425 in each direction while maintaining the horizontal posture.

Figure 9B:
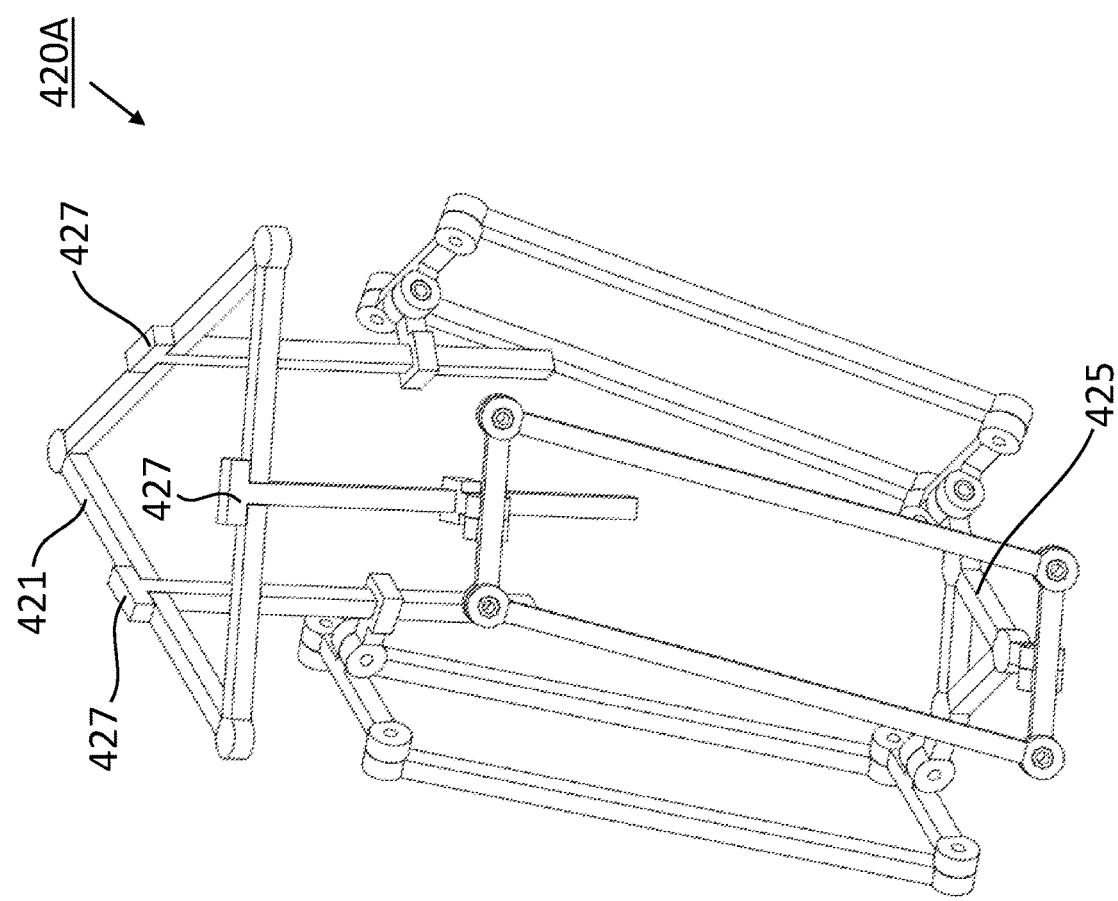
FIG. 9B is a perspective view schematically showing an example of the robot (delta robot) using the joint structure according to the embodiment.

As shown as an example in FIG. 9B, the actuators used for the delta robot 420 do not have to be limited to the rotary motors 422. FIG. 9B is a perspective view schematically showing an example of a delta robot 420A in which linear motors 427 that drive output rods in the vertical direction are used as actuators.

As shown as an example in FIG. 9B, the delta robot 420A according to this usage example has the same configuration as that of the delta robot 420 described above, except that the rotary motors 422 are replaced by the linear motors 427 for linear movement. The delta robot 420A can operate in a manner similar to that of the delta robot 420 by moving the output rods of the linear motors 427 in the upper-lower direction.

Characteristics

As described above, in the joint structure 1 according to the present embodiment, the two rotatable members (11 and 12) are coupled with each other in an axially rotatable manner. Moreover, each of the rotatable members (11 and 12) includes two coupling portions 21 for coupling the link members 31 constituting a link of a robot. Thus, as shown in the foregoing usage example, it is possible to couple the plurality of link members 31 via the joint structures 1, by coupling the different link members 31 with the different rotatable members (11 and 12). Furthermore, when the link members 31 are moved by an external force acting from actuators or the like, the rotatable members (11 and 12) can axially rotate in accordance with the rotation of the link members 31.

That is to say, the joint structures 1 according to the present embodiment can be driven by an external force transmitted from the link members 31, and thus it is possible to change a positional relationship between the link members 31 coupled with the different rotatable members (11 and 12). Moreover, it is possible to construct various link mechanisms as described in the usage examples using the joint structures 1. Accordingly, the joint structures 1 according to the present embodiment are modularized and can be used for general purposes.

Furthermore, in the present embodiment, the face portions (112 and 121) that face each other, of the rotatable members (11 and 12) that are adjacent to each other in the axial direction, are respectively provided with the recess portions (115 and 126), and the thrust bearing 14 is arranged in the internal space defined by the recess portions (115 and 126). Thus, the strength in the axial direction of the joint structure 1 according to the present embodiment is ensured by the thrust bearing 14.

Furthermore, in the present embodiment, the internal space defined by the recess portions (115 and 126) further accommodates the encoder 16 capable of detecting a relative rotational angle between the rotatable members (11 and 12). Thus, in the present embodiment, the encoder 16 can be prevented from being coming into contact with the outside without using extra constituent elements such as casings, and thus the possibility that the encoder 16 will be out of order due to an external force can be significantly lowered.

Furthermore, since the encoder 16 is arranged in the internal space, it is less likely to be affected by the deformation of the joint structure 1 compared with the case in which it is arranged outside. That is to say, even when the outer shape of the joint structure 1 is deformed by an external force, the internal space defined by the recess portions (115 and 126) is less likely to be deformed. Thus, even when the outer shape of the joint structure 1 is deformed, a positional relationship between the scale 161 and the detecting element 162 constituting the encoder 16 hardly changes. Accordingly, even when used in a situation where an external force is applied, the joint structure 1 can stably detect a relative rotational angle between the rotatable members (11 and 12).

Moreover, in the present embodiment, the scale 161 rotates in one piece with the second rotatable member 12, and the detecting element 162 rotates in one piece with the first rotatable member 11. Thus, in the joint structure 1 according to the present embodiment, errors are not caused by backlash or slippage compared with a method in which rotation of the rotatable members (11 and 12) is measured using an external encoder via transmission components such as belts, gears, or couplings. Accordingly, the joint structure 1 according to the present embodiment can accurately detect a relative rotational angle between the rotatable members (11 and 12).

In the present embodiment, the rotatable members (11 and 12) each have a columnar basic shape, and the coupling portions 21 are formed by cutting, in the tangential direction, an arc portion of the basic shape. That is to say, the rotatable members (11 and 12) do not have a shape having a portion projecting from a circle, and thus the rotatable members (11 and 12) can be produced through lathe machining. Thus, even when producing the rotatable members (11 and 12) through processing, it is very easy to produce the rotatable members (11 and 12).

Furthermore, the joint structure 1 according to the present embodiment is of an externally-driven type, and constituent components that are essential for a joint structure with a built-in actuator, such as a housing for accommodating the actuator, are not necessary. Thus, the joint structure 1 can be made compact and light. Moreover, the joint structure 1 according to the present embodiment does not have a complex structure, and thus it can be easily produced with a simple design.

Furthermore, in the joint structure 1 according to the present embodiment, the first rotatable member 11 excluding the shaft member 13 has substantially the same shape as the second rotatable member, and thus the rotatable members (11 and 12) are bilaterally symmetric about the axial direction. Specifically, the side face portions (113 and 123) have a shape that is symmetric about a plane perpendicular to the axial direction of the shaft member 13. Thus, with the joint structure 1 according to the present embodiment, it is easy to construct a closed link mechanism. Furthermore, if the rotatable members (11 and 12) of the plurality of joint structures 1 are alternately coupled via the link members 31, it is possible to construct a link mechanism without increasing the volume.

Furthermore, in the present embodiment, the two coupling portions 21 provided in each of the rotatable members (11 and 12) are arranged at positions at 180 degrees about an axis, on the side wall portions (113 and 123). Accordingly, the coupling portions 21 of each of the rotatable members (11 and 12) are arranged symmetric about the axial direction, and thus the link members 31 coupled with the rotatable members (11 and 12) can be used symmetrically about the axial direction. For example, even when a link mechanism including the joint structure 1 in which the link member 31 on the first rotatable member 11 side is fixed is changed by reversing the joint structure 1 so that the link member 31 on the second rotatable member 12 side is fixed, the same link mechanism can be constructed. Furthermore, in the present embodiment, the rotatable member 11, which is one of the two rotatable members (11 and 12), is formed in one piece with the shaft member 13, and the rotatable member 12, which is the other rotatable member, has the through hole 124 into which the shaft member 13 can be inserted. Then, the radial bearings 15 can be arranged so as to be interference-fitted to the shaft member 13 and clearance-fitted to the inner circumferential wall of the through hole 124, or so as to be clearance-fitted to the shaft member 13 and clearance-fitted to the inner circumferential wall of the through hole 124. Accordingly, for example, the following effects can be expected. That is to say, in the joint structure 1 according to the present embodiment, when the link member 31 on the first rotatable member 11 side is fixed, the second rotatable member 12 rotates, and radial loads of the rotating outer ring and the stationary inner ring act inside. Thus, the diameter of the through hole 124 into which the radial bearings 15 are to be inserted is determined assuming the radial loads. For example, if the second rotatable member 12 is driven at unbalanced load, the fitting of the radial bearings 15 is set such that the inner ring is interference-fitted and the outer ring is clearance-fitted. That is to say, the radial bearings 15 with an inner diameter that is slightly smaller than the outer diameter of the shaft member 13 and an outer diameter that is slightly smaller than the diameter of the through hole 124 are arranged so as to be interference-fitted to the shaft member 13 and clearance-fitted to the inner circumferential wall of the through hole 124. Thus, the diameter of the through hole 124 is determined so as to be larger than the outer diameter of the radial bearings 15. Meanwhile, when the second rotatable member 12 is driven at a stationary load, setting of the radial bearings 15 needs to be changed such that the inner ring is clearance-fitted and the outer ring is interference-fitted. That is to say, the radial bearings 15 with an inner diameter that is slightly larger than the outer diameter of the shaft member 13 and an outer diameter that is slightly larger than the diameter of the through hole 124 are arranged so as to be clearance-fitted to the shaft member 13 and interference-fitted to the inner circumferential wall of the through hole 124. At this time, if the radial bearings 15 are not changed, the diameter of the through hole 124 needs to be changed. On the other hand, the joint structure 1 according to the present embodiment has a shape that allows the link members 31 to be used in a bilaterally symmetric manner.

Thus, if the link member 31 on the second rotatable member 12 side is fixed and a stationary load is caused to act on the first rotatable member 11, the joint structure 1 according to the present embodiment can be used as it is for link mechanisms without changing the diameter of the through hole 124 or the diameter of the shaft member 13, even when load conditions applied thereto vary. If a link mechanism is constructed using a plurality of joint structures 1, the joint structures 1 in both forms in which the inner rings of the radial bearings 15 are interference-fitted and in which the inner rings of the radial bearings 15 are clearance-fitted may be used. In this case, it is possible to construct a link mechanism that is compact in the axial direction, by using, symmetrically about the axial direction, the joint structure 1 in which the inner rings of the radial bearings 15 are interference-fitted and the joint structure 1 in which the inner rings of the radial bearings 15 are clearance-fitted.

Here, "the coupling portions are arranged symmetric about the axial direction" refers to a state in which the connecting relationship of the rotatable members (11 and 12) can be switched by reversing the joint structure 1 about an axis (an axis SA or an axis SB in FIG. 1) perpendicular to the axial direction, while maintaining the positional relationship between the plurality of link members 31 coupled with the rotatable members (11 and 12). That is to say, if it is assumed that the joint structure 1 given as an example in FIG. 1 is reversed about the axis SA (y axis) or the axis SB (z axis), the link member 31 coupled with the first rotatable member 11 before reversing can be coupled with the coupling portion 21 of the second rotatable member 12 without changing the position after reversing. Furthermore, the link member 31 coupled with the second rotatable member 12 before reversing can be coupled with the coupling portion 21 of the first rotatable member 11 without changing the position after reversing. Accordingly, it is possible to use the joint structure 1 as a joint of inner ring rotation in which the first rotatable member 11 rotates or as a joint of outer ring rotation in which the second rotatable member 12 rotates, by changing the orientation of the joint structure 1 that is used for the link mechanism, without changing the structure of the link mechanism. Furthermore, it is also possible to change the positions of the wiring groove portions 114 as appropriate. Note that "the coupling portions are arranged symmetric about the axial direction" is not limited to the example in which two coupling portions provided in each of the rotatable members (11 and 12) are arranged at positions at 180 degrees about an axis, but may be designed as appropriate according to an embodiment.

Furthermore, the two coupling portions 21 provided on each of the side wall portions (113 and 123) of the rotatable members (11 and 12) are arranged at positions at 180 degrees about an axis, and thus the coupling portions 21 are symmetric about an axis in each of the rotatable members (11 and 12). Thus, even when the joint structure 1 according to the present embodiment is axially rotated, it can be used while maintaining the positional relationship between the link members. Accordingly, it is also possible to change the positions of the wiring groove portions 114 as appropriate. Note that the state in which the coupling portions are symmetric about an axis in each rotatable member is not limited to the example in which two coupling portions are arranged at positions at 180 degrees about an axis, and may be designed as appropriate according to an embodiment.

Moreover, in the joint structure 1 according to the present embodiment, it is also possible to make not only the outer shape but also the entire weight balance bilaterally symmetric, by selecting as appropriate the weights of the constituent elements. Thus, the following effects can be expected. That is to say, since a conventional joint structure with a built-in actuator is driven by an electric motor, use of an electric motor alone leads to driving at high speed and low torque, which is not suitable to drive a robot. Thus, an electric motor is used in combination with a reduction drive.

Accordingly, the conventional joint structure with a built-in actuator cannot make the entire weight balance bilaterally symmetric due to a difference between the flow rates of the electric motor and the reduction drive. Thus, in a link mechanism using such a joint structure, typically, the weights on the left and right sides cannot be balanced. Accordingly, a force that twists the links occurs, and thus the links before and after the joint structure may come into contact with each other. This aspect is problematic especially in the case of robots such as the robot 400 in which the link mechanisms are arranged in a vertical face.

Furthermore, for example, it is assumed that joint structures whose weight balance is not bilaterally symmetric are alternatively arranged to make the weight balance of the entire link mechanism bilaterally symmetric. Also in this case, since the joint structures are alternatively arranged, wires extending from the joint structures become alternatively located, and thus the arrangement of wires in the entire link mechanism becomes poor.

Meanwhile, the joint structure 1 according to the present embodiment is of an externally-driven type, and does not have a built-in electric motor and reduction drive, and thus it is possible to make the entire weight balance bilaterally symmetric, by selecting as appropriate the weights of the constituent elements. Thus, in the link mechanism (e.g., the robot 400 described above) using the joint structure 1, the entire weight balance can be made substantially bilaterally symmetric, and the link members 31 before and after the joint structure 1 can be prevented from coming into contact with each other. Moreover, the joint structures 1 do not have to be alternatively arranged in order to make the weight balance of the link mechanism bilaterally symmetric, and thus the arrangement of wires in the entire link mechanism can be prevented from becoming poor.

§ 3 Modified Example

Above, an embodiment of the present invention was described in detail, but the description above is in all aspects merely an example of the present invention. It will be appreciated that various improvements and modifications can be made without departing from the scope of the present invention. Furthermore, the constituent elements of the joint structure 1 may be omitted, replaced or added, as appropriate, according to an embodiment. The shape and the size of the constituent elements of the joint structure 1 may be set as appropriate according to an embodiment. For example, the following changes may be made. Note that in modified examples described below, the same constituent elements as in the foregoing embodiment are denoted by the same reference numerals, and a description thereof has been omitted as appropriate. The following modified example may be combined as appropriate.

3.1

For example, the joint structure 1 according to the foregoing embodiment includes two rotatable members (11 and 12). However, the number of rotatable members included in the joint structure of the present invention does not have to be that in the examples of the foregoing embodiment, and may be three or more.

Figure 10:
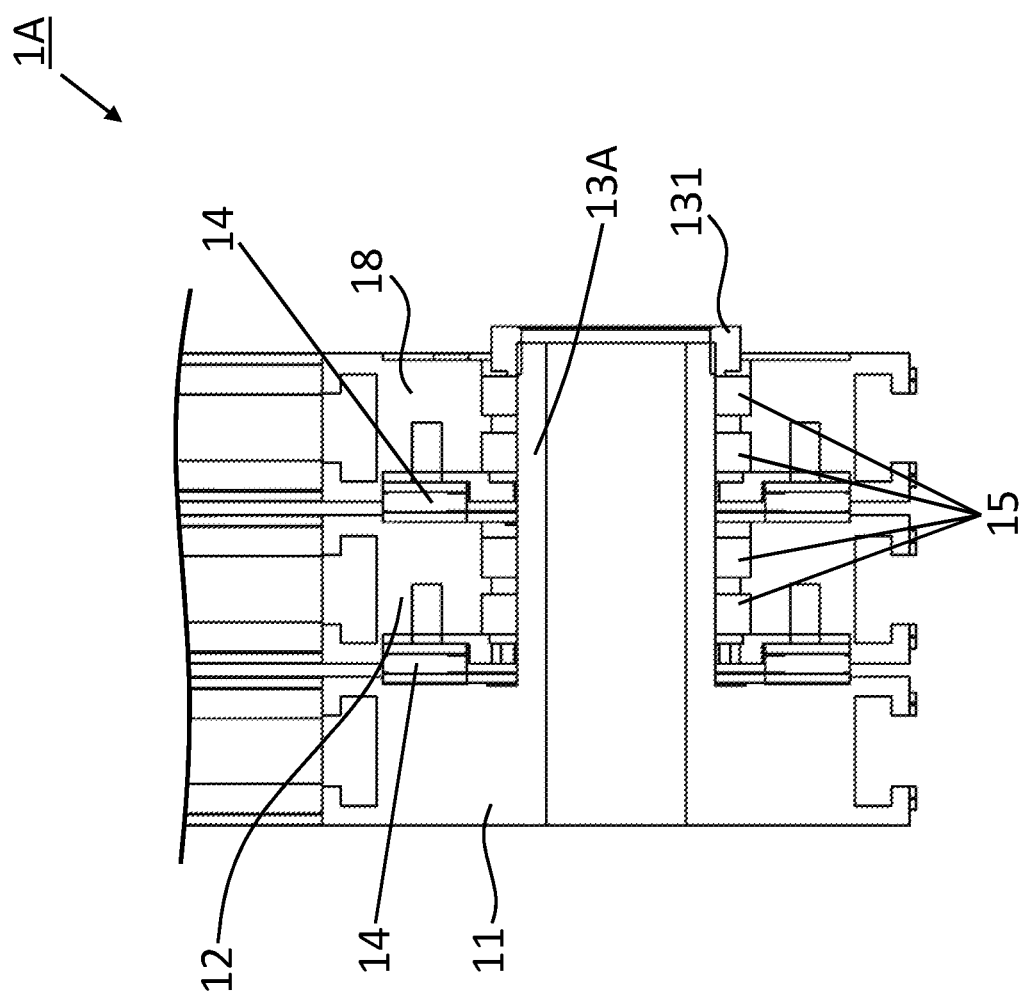
FIG. 10 is a cross-sectional view schematically showing an example of a joint structure according to another embodiment.

Hereinafter, an example thereof will be described with reference to FIG. 10. FIG. 10 is a cross-sectional view schematically showing an example of a joint structure 1A including three rotatable members (11, 12, and 18). As shown in FIG. 10, the joint structure 1A according to this modified example is formed so as to be substantially similar to in the joint structure 1 described above. That is to say, a third rotatable member 18 has the same configuration as that of the second rotatable member 12. The internal space between the first rotatable member 11 and the second rotatable member 12 and the internal space between the second rotatable member 12 and the third rotatable member 18 accommodate the thrust bearing 14 and an encoder as appropriate as in the foregoing embodiment. Furthermore, a shaft member 13A has the same configuration as that of the shaft member 13 according to the foregoing embodiment, except that the length in the axial direction is made longer by the length for allowing the third rotatable member 18 to be attached. Furthermore, two radial bearings 15 are arranged between the second rotatable member 12 and the shaft member 13A and between the third rotatable member 18 and the shaft member 13A, as in the foregoing embodiment. Accordingly, the joint structure 1A includes three rotatable members (11, 12, and 18) coupled with each other in an axially rotatable manner.

That is to say, in the foregoing embodiment, it is possible to adjust the number of second rotatable members 12 that are attached to the shaft member 13 by adjusting the length in the axial direction of the shaft member as appropriate. Accordingly, a joint structure including three or more rotatable members can be produced as appropriate. Note that the method for producing a joint structure including three or more rotatable members is not limited to the example described above, and may be selected as appropriate according to an embodiment, as in modified examples, which will be described later.

3.2

For example, in the foregoing embodiment, the face portions (111, 112, 121, and 122) of the rotatable members (11 and 12) are formed in the shape of a circle. However, the shape of the rotatable members (11 and 12) does not have to be limited to this example, and may be selected as appropriate according to an embodiment. For example, the shape of the face portions (111, 112, 121, and 122) of the rotatable members (11 and 12) may be a polygon such as a hexagon, or may be an oval. In the case of these shapes, the outer shape of the rotatable members (11 and 12) may be formed symmetric about the axial direction.

3.3

Furthermore, for example, in the foregoing embodiment, each of the rotatable members (11 and 12) includes two coupling portions 21. However, the number of coupling portions 21 included in each of the rotatable members (11 and 12) is not limited to two, and may be selected as appropriate according to an embodiment. For example, the number of coupling portions 21 included in each of the rotatable members (11 and 12) may be one, or may be three or more. At this time, the coupling portions 21 may be arranged at the side wall portions (113 and 123) as in the foregoing embodiment, or may be arranged at the face portions (111, 112, 121, and 122) as in the foregoing modified example.

3.4

Furthermore, for example, in the foregoing embodiment, the coupling portions 21 are arranged at the side wall portions (113 and 123) of the rotatable members (11 and 12). However, the arrangement of the coupling portions 21 does not have to be limited to this example, and the coupling portions 21 may be arranged at the face portions (111, 112, 121, and 122) of the rotatable members (11 and 12).

Figure 11:
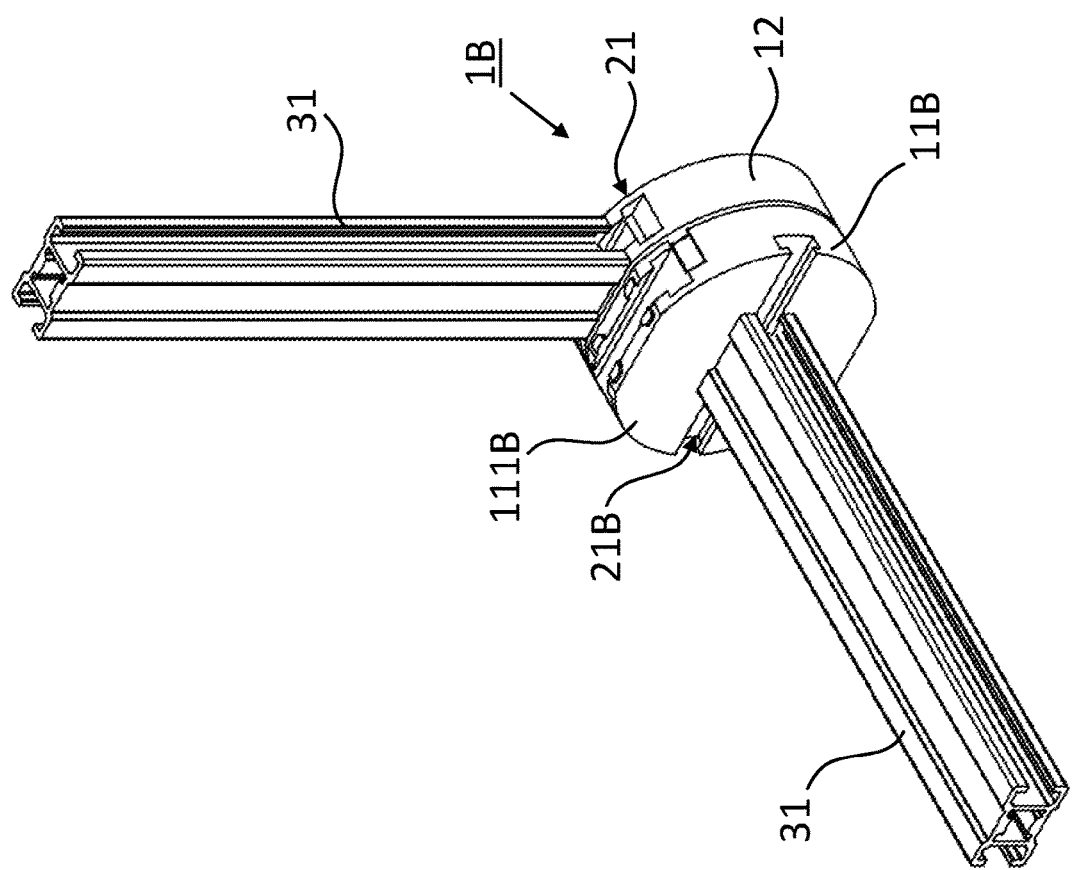
FIG. 11 is a perspective view schematically showing an example of a joint structure according to another embodiment.

Hereinafter, an example thereof will be described with reference to FIG. 11. FIG. 11 schematically shows an example of a joint structure 1B in which a first face portion 111B of a first rotatable member 11B has a coupling portion 21B. As shown as an example in FIG. 11B, the first rotatable member 11B has the same configuration as that of the first rotatable member 11 described above, except that the first face portion 111B is provided with the coupling portion 21B. The coupling portion 21B has the same configuration as that of the coupling portion 21. Thus, it is possible to couple the link members 31 with the coupling portion 21B, using the above-described coupling method.

If at least one coupling portion is provided at one of a pair of face portions of at least one of a plurality of rotatable members, and at least one coupling portion is provided at a side wall portion of another rotatable member of the plurality of rotatable members as shown as an example in FIG. 11, the following effects can be expected. That is to say, the link connecting direction can be changed between the coupling portion provided at the face portion (e.g., the coupling portion 21B of the first rotatable member 11B) and the coupling portion provided at the side wall portion (e.g., the coupling portion 21 of the second rotatable member 12). Thus, the link connecting direction can be changed without a special structure, and thus the link mechanism that is to be constructed can be made compact on the whole.

Note that the face portion at which a coupling portion can be provided is not limited to the first face portion of the first rotatable member. For example, a coupling portion may be provided on the second face portion side of the second rotatable member. Furthermore, if a coupling portion is provided at a face portion of each rotatable member, the coupling portion may be provided via an attachment or the like.

3.5

Furthermore, for example, in the foregoing embodiment, the two coupling portions 21 are arranged at positions at 180 degrees about the center in the surface direction of the rotatable members (11 and 12) (hereinafter, this angle is referred to as "angle between adjacent coupling portions"). However, if a plurality of coupling portions 21 are provided at the side wall portions (113 and 123), the positional relationship between the coupling portions 21 does not have to be limited to this example, and may be selected as appropriate according to an embodiment.

For example, the angle between adjacent coupling portions may be set at an obtuse angle or an acute angle. Furthermore, for example, if a polygonal link is constructed using link members, the angle between adjacent coupling portions may be set to be the same as the angle of one corner of the polygon such that the joint structures can be arranged at the respective corners. If the joint structures in which the angle between adjacent coupling portions is an obtuse angle are used, for example, a boomerang-shaped parallel link mechanism as shown in FIG. 12 can be constructed.

Figure 12:
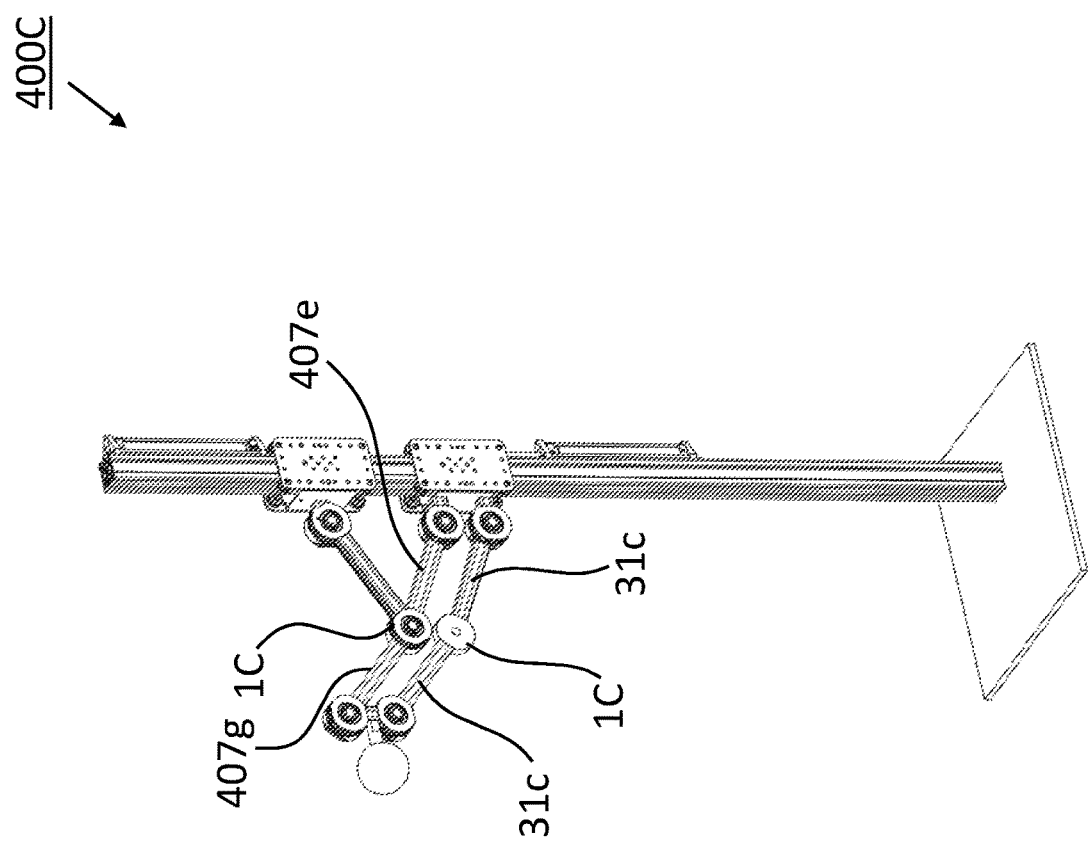
FIG. 12 is a perspective view schematically showing an example of a robot (Scott Russell mechanism) using a joint structure according to another embodiment.

FIG. 12 is a perspective view schematically showing an example of a robot 400C using joint structures 1C in which an angle between adjacent coupling portions is an obtuse angle. In the robot 400C given as an example in FIG. 12, the joint structure 408d arranged at the middle in the Scott Russell mechanism portion of the robot 400 described above is replaced by a joint structure 1C in which the angle between adjacent coupling portions is an obtuse angle.

Thus, two link members (407e and 407g) coupled with the joint structure 1C constitute a link that is bent in a boomerang shape. Accordingly, in this modified example, the link member 407f of the robot 400 is replaced by the joint structure 1C and two link members 31c.

Each link member 31c has the same configuration as that of the link member 31, and has the same length as each of the link members (407e and 407g). Accordingly, the link constituted by the two link members 31c and the joint structure 1C has the same shape as the link constituted by the two link members (407e and 407g) and the joint structure 1C. That is to say, a boomerang-shaped parallel link is formed.

As described above, if the joint structure 1C in which the angle between adjacent coupling portions is an obtuse angle is used, the robot 400C in which the parallel link is in a boomerang shape can be constructed. Note that the link on the lower side may use link members with the same shape as the boomerang-shaped link constituted by two link members (407e and 407g) without using the joint structure 1C.

Furthermore, for example, in the foregoing embodiment and modified examples, the link member 31 is coupled with a rotatable member so as to extend in the radial direction or the axial direction (direction that is perpendicular to a face). However, the orientation in which the link member 31 is coupled does not have to be limited to this example, and may be selected as appropriate according to an embodiment. For example, the end face 210 of the coupling portion 21 (21B) may be at an angle with respect to the radial direction (axial direction). Accordingly, the link member 31 can be coupled with the coupling portion 21 (21B) so as to be inclined from the radial direction or the axial direction with respect to the rotatable member.

3.6

Furthermore, for example, in the foregoing embodiment and modified examples, the shaft member 13 (13A) is formed in one piece with the first rotatable member 11. However, the shaft member 13 (13A) may be formed in one piece with a rotatable member other than the first rotatable member 11. If a joint structure includes three or more rotatable members as in the foregoing modified example, the shaft member 13 (13A) may be formed in one piece with either of the two rotatable members arranged on the outermost side. Furthermore, the shaft member 13 (13A) may be formed in one piece with any of those arranged between the two rotatable members arranged on the outermost side. In this case, the shaft member 13 (13A) is formed so as to extend in the axial direction from face portions on both sides of the rotatable member. Furthermore, the shaft members 13 (13A) may be formed in one piece respectively with the two rotatable members arranged on the outermost side. In this case, the shaft members 13 (13A) extending from the rotatable members may be configured such that they can be coupled with each other through screwing or the like.

Figure 13:
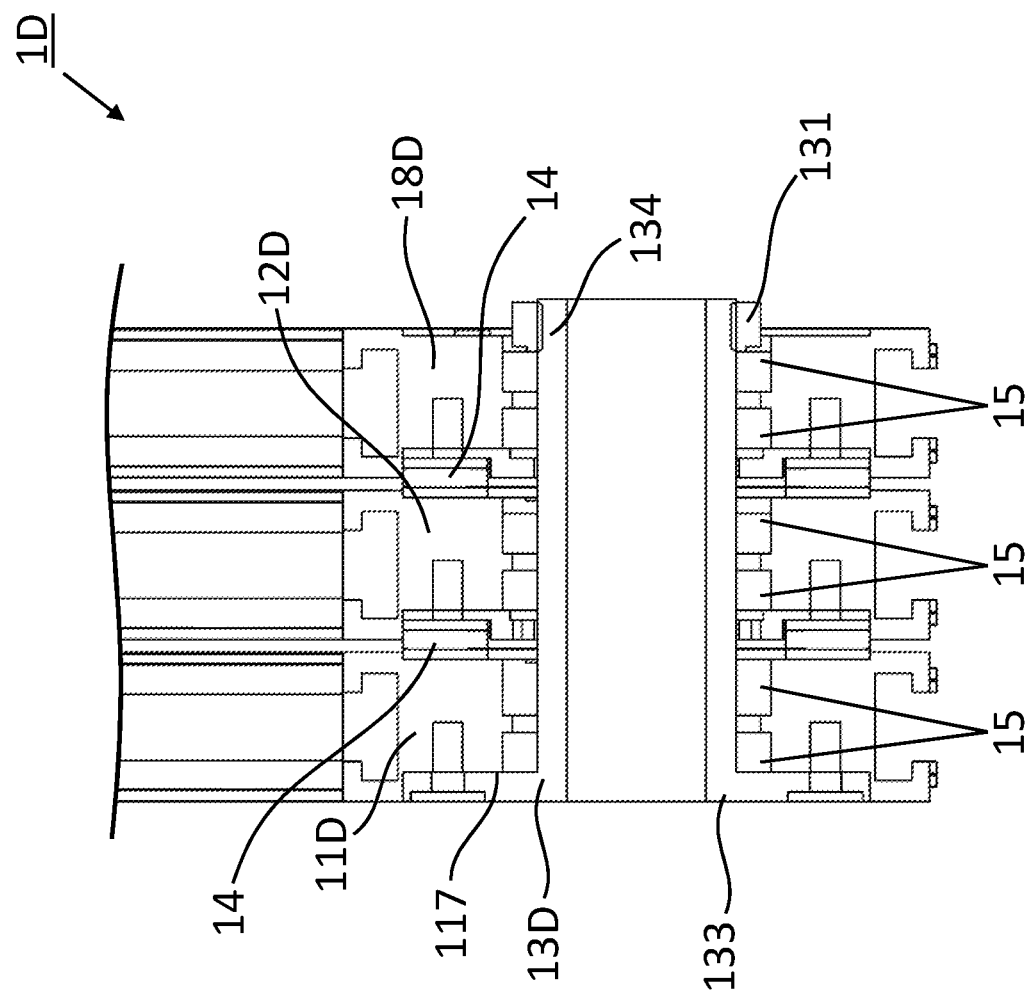
FIG. 13 is a cross-sectional view schematically showing an example of a joint structure according to another embodiment.

Furthermore, as shown as an example in FIG. 13, the shaft member 13 (13A) may be formed separately from the rotatable members. FIG. 13 is a perspective view schematically showing an example of a joint structure 1D including a shaft member 13D formed separately from a first rotatable member 11D. As shown as an example in FIG. 13, the rotatable members (11D, 12D, and 18D) each have substantially the same configuration as that of the second rotatable member 12 described above.

The shaft member 13D according to this modified example includes a circular ring-like base portion 133 and a cylindrical portion 134 extending in the axial direction from the base portion 133. The cylindrical portion 134 is formed so as to be substantially similar to in the shaft member 13 (13A) described above. That is to say, the length in the axial direction of the cylindrical portion 134 matches the total of the widths of the rotatable members (11D, 12D, and 18D). Furthermore, the outer diameter of the cylindrical portion 134 is smaller than the inner diameter of the rotatable members (11D, 12D, and 18D) to the extent that the radial bearings 15 can be arranged. Accordingly, the radial bearings 15 are arranged between the shaft member 13D and the rotatable members (11D, 12D, and 18D).

Meanwhile, the outer diameter of the base portion 133 is larger than the outer diameter of the cylindrical portion 134. Accordingly, the base portion 133 is not allowed to be inserted into the through holes of the rotatable members (11D, 12D, and 18D). In this modified example, a recess portion 117 provided at a face portion of the first rotatable member 11D has the same diameter as the outer diameter of the base portion 133, and the base portion 133 is fitted into the recess portion 117 of the first rotatable member 11D. The base portion 133 may be fixed to the face portion of the first rotatable member 11D through screwing or the like. Note that the inner diameter of the base portion 133 is the same as the inner diameter of the cylindrical portion 134.

As described above, the shaft member may be formed separately from the rotatable members. In this case, as shown as an example in the foregoing modified example, all the rotatable members (11D, 12D, and 18D) may be formed in the same shape. Thus, the production cost of the joint structures can be reduced, which makes it possible to construct a link mechanism of a robot at a lower cost.

As in the foregoing embodiment, the face portions of the rotatable members (11D, 12D, and 18D) may include recess portions with a shape that allows the thrust bearing 14 and the encoder 16 to be accommodated when the face portions are positioned facing each other. Furthermore, in the foregoing embodiment and modified examples, the shaft member 13 (13A, 13D) is formed so as to be hollow. However, the shaft member 13 (13A, 13D) may be formed so as to be solid.

Furthermore, in the joint structure 1D according to this modified example, the shaft member 13D is coupled with the first rotatable member 11, and thus the radial bearings 15 arranged inside the through hole of the first rotatable member 11 may be omitted. The joint structure 1D on the first rotatable member 11 side may be heavier by the weight corresponding to the base portion 133 of the shaft member 13D being arranged on the first rotatable member 11 side. Meanwhile, if the radial bearings 15 arranged inside the through hole of the first rotatable member 11 are omitted, it is easy to make the entire weight balance of the joint structure 1D bilaterally symmetric.

3.7

Furthermore, in the foregoing embodiment and modified examples, a link member is individually coupled with a rotatable member. However, the corresponding relationship between a link member and a rotatable member does not have to be limited to this example. As in the modified examples given as an example in FIGS. 10 and 13 above, if a joint structure includes three or more rotatable members, coupling portions of at least two rotatable members may be coupled with the same link member.

Figure 14:
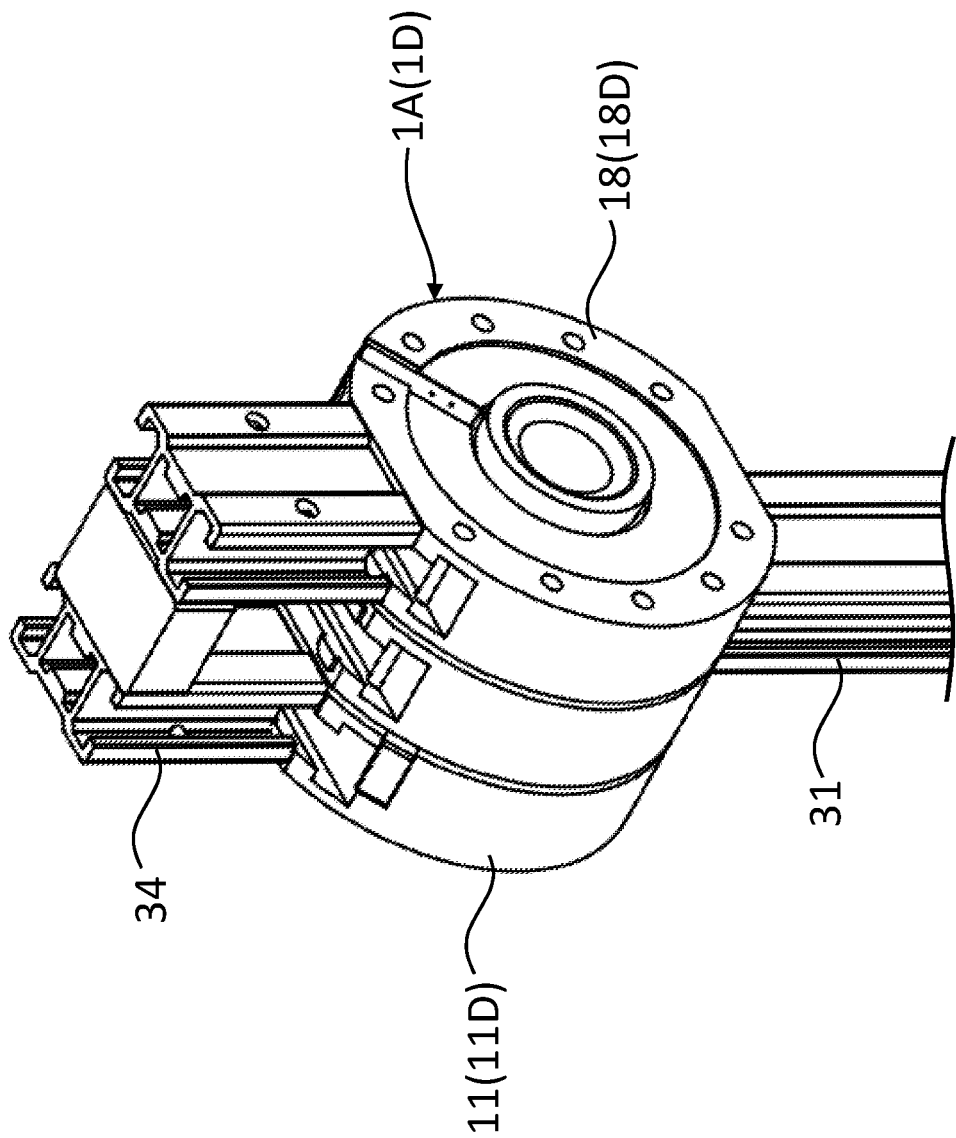
FIG. 14 is a perspective view schematically showing an example of a joint structure according to another embodiment.

Hereinafter, an example thereof will be described with reference to FIG. 14. FIG. 14 is a perspective view schematically showing an example of a state in which a coupling portion of the first rotatable member 11 (11D) and a coupling portion of the third rotatable member 18 (18D) are coupled with the same the link member 34. "Same link member" may be formed in one piece, or may be formed by combining a plurality of members, as long as a plurality of rotatable members can be simultaneously driven.

As shown as an example in FIG. 14, a link member 34 according to this modified example is formed in the shape of a U with square corners, and has end portions with the same configuration as that of the link member 31. The link member 34 can be produced by coupling two link members 31 as appropriate through welding or the like. The end portions of the link member 34 are coupled with the coupling portions of the first rotatable member 11 (11D) and the third rotatable member 18 (18D). Accordingly, the first rotatable member 11 (11D) and the third rotatable member 18 (18D) can be coupled with the same the link member 34. Note that the number of rotatable members that are coupled with the same link member does not have to be limited to this example. Coupling portions of three or more rotatable members may be coupled with the same link member.

In this manner, if coupling portions of at least two rotatable members are coupled with the same link member, even when a relatively large force acts from the link member on the joint structure, the force can be divided between and received by the plurality of rotatable members. Accordingly, deformation of the shaft member of the joint structure due to an external force can be suppressed.

Note that the rotatable members that are coupled with the same link member may be selected as appropriate according to an embodiment. For example, as shown as an example in FIG. 14, coupling portions of the two rotatable members arranged on the outermost side may be coupled with the same link member. Furthermore, coupling portions of a pair of rotatable members with one or a plurality of rotatable members interposed therebetween may be coupled with the same link member. Accordingly, a force that acts from a rotatable member arranged between a pair of rotatable members coupled with the same link member can be received by the pair of rotatable members arranged on both sides. Thus, a force that acts on the joint structure can be prevented from being locally concentrated and be dispersed. Accordingly, it is possible to properly suppress deformation of the shaft member of the joint structure due to an external force, by selecting the rotatable members that are coupled with the same link member in this manner.

3.8

Figure 15:
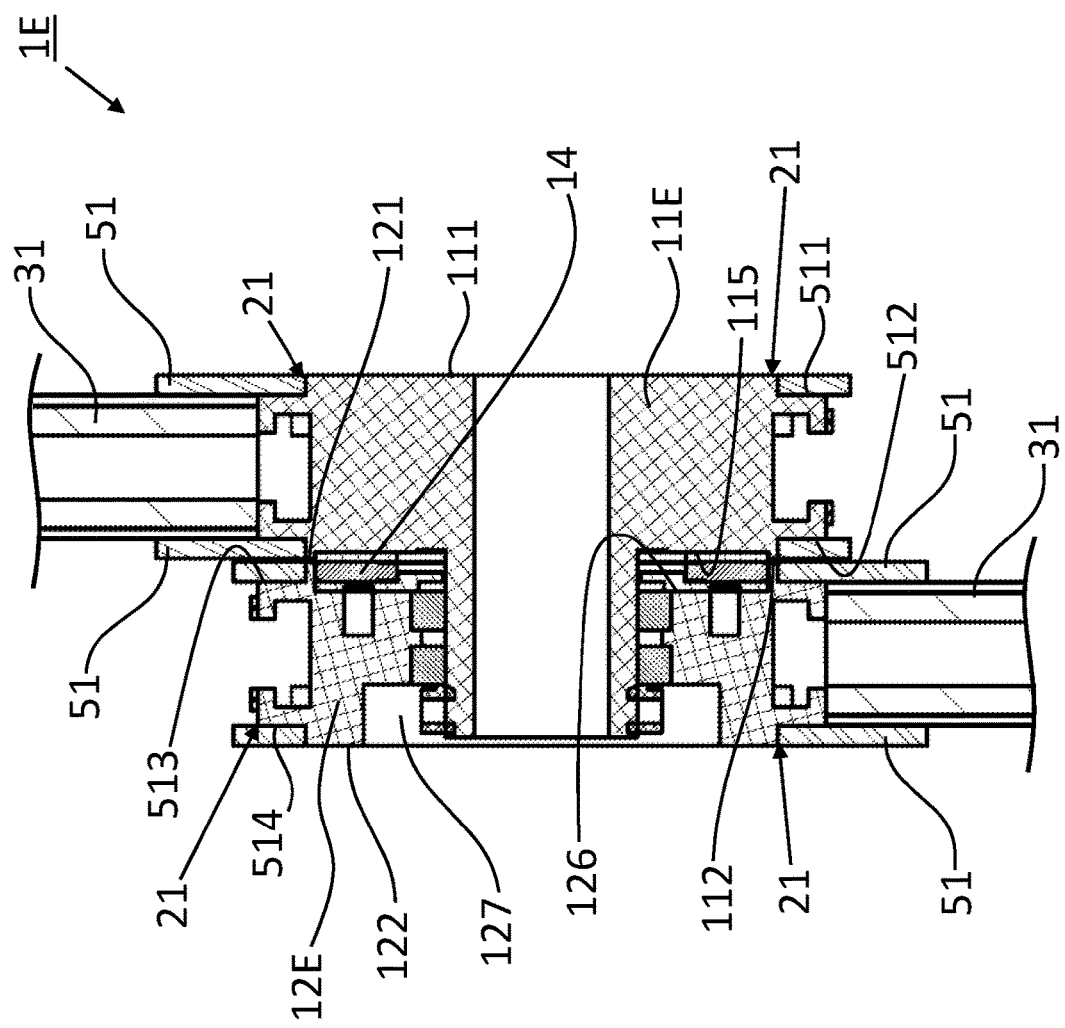
FIG. 15 is a cross-sectional view schematically showing an example of a joint structure according to another embodiment.

Furthermore, as shown as an example in FIG. 15, coupling between a coupling portion of a rotatable member and a link member may be reinforced using a reinforcing plate. FIG. 15 is a cross-sectional view schematically showing an example of a joint structure 1E including reinforcing plates 51 for reinforcing coupling between the coupling portion 21 and the link member 31. As shown as an example in FIG. 15E, the joint structure 1E according to this modified example includes two rotatable members (11E and 12E) as in the foregoing embodiment.

The face portions (111, 112, 121, and 122) of the rotatable members (11E and 12E) include reinforcing plate-corresponding recess portions 511 to 514 in the shape of a circular ring extending inward in the radial direction from the outer circumferential face such that the reinforcing plates 51 substantially in the shape of a circular ring can be arranged. Except for this aspect, the rotatable members (11E and 12E) have the same configuration as that of the rotatable members (11 and 12) described above.

The inner diameter of the reinforcing plate-corresponding recess portions 511 to 514 is the same as the inner diameter of the reinforcing plates 51. The inner diameter of the reinforcing plate-corresponding recess portions (512 and 513) is larger than the outer diameter of the recess portions (115 and 126) such that a partition wall is provided between the reinforcing plate-corresponding recess portions (512 and 513) and the recess portions (115 and 126). Accordingly, the inner circumferential walls of the reinforcing plates 51 and the thrust bearing 14 are prevented from being coming into contact with each other. The inner diameter of the reinforcing plate-corresponding recess portion 514 is also larger than the outer diameter of the second recess portion 127.

With this configuration, the reinforcing plates 51 are arranged adjacent in the axial direction to the coupling portions 21 respectively. Furthermore, the reinforcing plates 51 have an outer diameter that is larger than the outer diameter of the face portions (111, 112, 121, and 122) of the rotatable members (11E and 12E). Thus, as shown as an example in FIG. 15, a pair of reinforcing plates 51 are arranged so as to hold the coupling region of the coupling portion 21 and the link member 31 from both sides in the axial direction and support the coupling portion. Accordingly, the reinforcing plates 51 can reinforce coupling between the coupling portion 21 and the link member 31.

That is to say, it is assumed that a moment in the axial direction (tangential direction) starting from the coupling region of the coupling portion 21 and the link member 31 acts on the link member 31. In this case, there is a possibility that a large force will act on the end face 210 of the coupling portion 21, break the thick-wall portions 212, and cancel the coupling between the coupling portion 21 and the link member 31. On the other hand, as in this modified example, if the reinforcing plates 51 are arranged adjacent in the axial direction to the coupling region of the coupling portion 21 and the link member 31, such a force can be received by the reinforcing plates 51. Accordingly, a large force can be prevented from acting on the end face 210 of the coupling portion 21, and thus the thick-wall portions 212 can be prevented from being broken. Accordingly, according to this modified example, it is possible to produce a joint structure that is unlikely to be broken by twisting.

Note that the method for arranging the reinforcing plates 51 does not have to be limited to this example, and may be selected as appropriate according to an embodiment. For example, it is also possible that the reinforcing plate-corresponding recess portions 511 to 514 as described above are not provided and the reinforcing plates 51 are directly arranged along the face portions (111, 112, 121, and 122) of the rotatable members (11E and 12E). The reinforcing plates 51 may be formed respectively in one piece with the rotatable members (11E and 12E). Furthermore, in the foregoing modified example, the pair of reinforcing plates 51 are arranged on both sides in the axial direction of the coupling portion 21. However, the reinforcing method using the reinforcing plates 51 does not have to be limited to this example, and, for example, either one of the reinforcing plates 51 may be omitted. That is to say, it is possible to produce a joint structure that is unlikely to be broken by twisting, by providing the reinforcing plate 51 for supporting the coupling region of the coupling portion 21 arranged at a side wall portion of the rotatable members (11E and 12E) and the link member 31, on at least one of both sides in the axial direction of the coupling region.

Furthermore, in the joint structure 1E according to this modified example, the joint structure 1E on the second rotatable member 12E side may be heavier by the weight corresponding to the radial bearings 15 being arranged on the second rotatable member 12E side. Meanwhile, if the reinforcing plates 51 on the second rotatable member 12E side (on the left side in FIG. 15) attached to the joint structures (11E and 12E) are omitted, it is easy to make the entire weight balance of the joint structure 1E bilaterally symmetric.

3.9

Furthermore, in the foregoing embodiment, the coupling portion 21 and the link member 31 are coupled with each other via the wedge member 32. However, the method for coupling the coupling portion 21 and the link member 31 does not have to be limited to this example, and may be selected as appropriate according to an embodiment. For example, as shown as an example in FIGS. 16A and 16B, the coupling between the coupling portion 21 and the link member 31 may be constituted by a magnet.

Figure 16B:
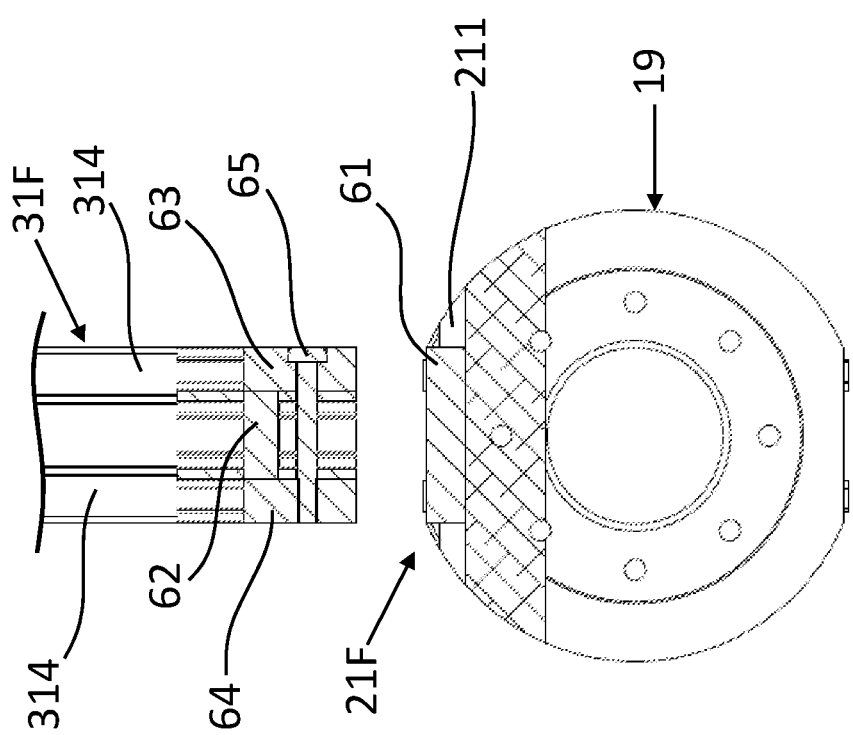
FIG. 16B is a partial cross-sectional view (a cross-section taken along the line C-C in FIG. 16A) schematically showing an example of a joint structure according to another embodiment.

FIG. 16A schematically shows an example of a rotatable member 19 in which the coupling between a link member 31F and a coupling portion 21F is constituted by a magnet. FIG. 16B is a partial cross-sectional view taken along the line C-C in FIG. 16A. The rotatable member is denoted by a reference numeral 19 for the sake of ease of description, and the rotatable member 19 corresponds to, for example, the second rotatable member 12 described above.

As shown as an example in FIG. 16B, the coupling portion 21F of the rotatable member 19 has the same shape as the coupling portion 21, and a rectangular soft magnetic plate 61 is attached to the groove portion 211 of the coupling portion 21F. Meanwhile, the link member 31F has the same shape as the link member 31, and a columnar permanent magnet 62 is arranged spanning between the groove portions 314. At this time, the permanent magnet 62 is arranged such that its N pole is positioned toward either one of the groove portions 314. The groove portions 314 are provided with rectangular soft magnetic pins (63 and 64) that are arranged in contact with the permanent magnet 62. The soft magnetic pins (63 and 64) are fixed by a non-magnetic bolt 65.

Note that the material of the soft magnetic plate 61 and the soft magnetic pins (63 and 64) may be electromagnetic soft iron. The material of the soft magnetic plate 61 and the soft magnetic pins (63 and 64) may be selected as appropriate from among soft magnetic materials. Furthermore, the material of the non-magnetic bolt 65 may be selected as appropriate from among non-magnetic materials.

The soft magnetic pins (63 and 64) and the soft magnetic plate 61 are arranged such that they can be brought into contact with each other. For example, the soft magnetic plate 61 is arranged such that the end face of the soft magnetic plate 61 is positioned close to the end face of the coupling portion 21F. In a similar manner, the soft magnetic pins (63 and 64) are arranged such that the end faces of the soft magnetic pins (63 and 64) are positioned close to the end face of the link member 31F.

Accordingly, when the soft magnetic pins (63 and 64) are brought into contact with the soft magnetic plate 61, a loop of a magnetic force is formed by the permanent magnet 62, the soft magnetic pins (63 and 64), and the soft magnetic plate 61. Thus, the soft magnetic pins (63 and 64) and the soft magnetic plate 61 can be coupled with each other at an appropriate intensity. In this modified example, the coupling between the coupling portion 21F and the link member 31F is constituted by a magnet in this manner.

According to this modified example, the coupling between the coupling portion 21F and the link member 31F is constituted by a magnet, and thus a link mechanism of a robot can be constructed without using tools. Accordingly, it is very easy to produce a robot.

Furthermore, when an excessive load is applied, coupling using a magnet is likely to be canceled. Thus, for example, if the coupling method using a magnet is used in a joint structure in which a force directly acts from an actuator, such as the joint structures (408*a*, 408*b*, and 408*c*) of the robot 400, the link mechanism can be disconnected from the actuator when an excessive load is applied. Accordingly, accidents that occur when an excessive load is applied can be suppressed. In a similar manner, in the case where the joint structure is used in an exoskeletal robot, if the coupling method using a magnet is used in a joint structure that acts on a human body, an excessive load that may damage the human body can be prevented.

Note that, in this modified example, the permanent magnet 62 is arranged on the link member 31F side. However, the arrangement of the permanent magnet 62 does not have to be limited to this example, and the permanent magnet 62 may be arranged on the rotatable member 19 side. Furthermore, as long as the loop of a magnetic force can be formed, the soft magnetic pins (63 and 64) and the soft magnetic plate 61 may be partially made of a non-magnetic material. Furthermore, the shape of each constituent element may be selected as appropriate according to an embodiment. For example, the permanent magnet 62 may be formed in a rectangular shape.

Furthermore, a coupling portion and a link member may be coupled with each other using a method other than a magnet. For example, in the foregoing embodiment, in a state where the end face 210 of the coupling portion 21 and the end face 310 of the link member 31 are arranged facing each other, the coupling portion 21 and the link member 31 are coupled with each other. However, depending on the thickness of the link member 31 and the width of the groove portion 211, the coupling portion 21 and the link member 31 may be coupled with each other in a state where the link member 31 is inserted into the groove portion 211. Furthermore, if each of the rotatable members includes a plurality of coupling portions, the coupling portions may be coupled with link members using different methods.

3.10

Furthermore, in the foregoing embodiment, the thrust bearing 14 are accommodated between the rotatable members (11 and 12) that are adjacent to each other in the axial direction, in order to receive a force that acts in the axial direction from the rotatable members (11 and 12). However, the bearing that can be arranged between the rotatable members (11 and 12) that are adjacent to each other in the axial direction do not have to be limited to this example as long as they are ring-like bearing for receiving a force that acts in the axial direction, and may be selected as appropriate according to an embodiment. For example, angular contact ball bearings capable of receiving a force in both of the thrust direction and the radial direction may be accommodated between the adjacent rotatable members (11 and 12).

If a joint structure includes three or more rotatable members, a recess portion with a shape that allows the bearing to be accommodated (e.g., the recess portion 115 and the first recess portion 126 of the foregoing embodiment) is provided between rotatable members that are adjacent to each other in the axial direction. The recess portion for accommodating the bearing may be arranged on both sides or one side of faces that face each other (e.g., the second face portion 112 and the first face portion 121 of the foregoing embodiment) of the adjacent rotatable members. If the recess portion is provided on both sides of the faces that face each other of the adjacent rotatable members, the heights (the lengths in the left-right direction in FIG. 2) of the recess portions may be the same or different from each other as long as they match the thickness of the bearing.

3.11

Furthermore, in the foregoing embodiment, the scale 161 is arranged on the second rotatable member 12 side, and the detecting element 162 is arranged on the first rotatable member 11 side. However, the arrangement of the scale 161 and the detecting element 162 does not have to be limited to this example, and they may be switched. That is to say, the scale 161 may be arranged on the first rotatable member 11 side, and the detecting element 162 may be arranged on the second rotatable member 12 side. In this case, the wiring groove portion 114 is provided on the second rotatable member 12 side, and the output of the detecting element 162 is taken out on the second rotatable member 12 side.

Furthermore, in the foregoing embodiment, the encoder 16 of the optical reflection type is used. However, the type of encoder that can be built in the joint structure 1 according to the present embodiment does not have to be limited to this example, and may be selected as appropriate according to an embodiment. For example, the joint structure 1 may have a built-in encoder of the optical transmissive type.

The encoder of the optical transmissive type can be constituted by, for example, a transmissive scale on which the optical transmittance periodically changes in the circumferential direction, and a detecting element including a light-emitting portion and a light-receiving portion. In this case, it is possible to detect a relative rotational angle between the adjacent rotatable members (11 and 12), by arranging the light-emitting portion and the light-receiving portion of the detecting element such that light emitted from one face side of the transmissive scale is received by the other face side.

Moreover, the joint structure 1 may include a magnetic-type or electrical resistance-type encoder. For example, the magnetic-type encoder can be constituted by a scale on which the magnetic force changes in the circumferential direction, and a detecting element such as a Hall element for detecting the magnetic force. For example, as the magnetic-type encoder, a magnetic encoder (model No.: AEAT-6600-T16, etc.) manufactured by AVAGO can be used. Furthermore, as the magnetic-type encoder, a resolver (e.g., Singlsyn (registered trademark) manufactured by Tamagawa Seiki Co., Ltd., etc.) can be also used.

Furthermore, in the foregoing embodiment, the scale 161 is attached to the plate 142 separately from the thrust bearing 14. However, the position at which the scale 161 is attached does not have to be limited to this example, and the scale 161 may be attached to the thrust bearing 14. For example, if the housing washer (not shown) of the thrust bearing 14 has a shape similar to that of the plate 142, the scale 161 may be attached to the end face of the housing washer. At this time, the washer 141 may be omitted, and the shaft washer of the thrust bearing 14 may be allows to be directly in contact with the bottom face of the recess portion 115. Accordingly, the encoder 16 can be constituted using a part of the thrust bearing 14, and thus the number of parts and the number of assembly steps can be reduced, and, moreover, the constituent elements accommodated in the internal space of the joint structure 1 can be made compact.

Furthermore, in the foregoing embodiment, the scale 161 and the detecting element 162 constituting the encoder 16 are arranged facing each other in the axial direction. However, the arrangement of the encoder 16 does not have to be limited to this example, and, for example, the scale 161 and the detecting element 162 may be arranged at the outer circumferential wall of the shaft member 13 and the inner circumferential wall of the thrust bearing 14 such that they face each other in the axial direction.

Furthermore, in the foregoing embodiment, the gap portion 116 in the shape of a circular ring is ensured such that the scale 161 and the detecting element 162 face each other in the axial direction. However, the shape of the gap portion 116 does not have to be limited to this example as long as the scale 161 and the detecting element 162 can face each other in the axial direction, and may be selected as appropriate according to an embodiment. For example, the gap portion 116 may have a sector-shaped cross-section.

Furthermore, if an optical encoder of the reflection type or the transmissive type is used as the encoder accommodated in the joint structure 1, an optical fiber may be arranged in the internal space of the joint structure 1, and the optical fiber may be used to emit and receive light to and from the scale. In this case, an electrical signal can be output via the optical fiber to the outside of the joint structure 1, and thus the detecting element and the board may be arranged outside the joint structure 1. In this case, metal materials can be eliminated from the constituent elements of the encoder built in the joint structure 1. Furthermore, if the other constituent elements are made of a resin, the joint structure 1 can be produced without using a metal material.

Furthermore, in the foregoing embodiment, the detecting element 162 transmits and receives an electrical signal by wire via the wiring board 163. However, the method of the detecting element 162 for transmitting and receiving an electrical signal does not have to be limited to this example. For example, the detecting element 162 may transmit and receive an electrical signal wirelessly using a wireless module. In this case, the wiring board 163 may be omitted. In the foregoing embodiment, the wiring board 163 is extended from the internal space to the outside via the wiring groove portion 114. However, the route of the wiring board 163 does not have to be limited to this example, and the wiring board 163 may be extended to the outside via the hollow portion 132 of the shaft member 13.

3.12

Furthermore, in the foregoing embodiment, the end face 210 of the coupling portion 21 is provided with four protruding portions 213, so that firm coupling between the coupling portion 21 and the link member 31 is realized. However, the number and the shape of protruding portions do not have to be those in the examples of the foregoing embodiment, and may be selected as appropriate according to an embodiment. The protruding portions provided at the end face of the coupling portion may be designed as appropriate according to the end face shape of the link member that is coupled with the coupling portion.

Furthermore, in the foregoing embodiment, the protruding portions 213 are formed in one piece with the end face 210. However, the configuration of the protruding portions 213 does not have to be limited to this example, and may be selected as appropriate according to an embodiment. For example, the protruding portions 213 may be provided by forming holes in the end face 210 and inserting pins into the holes.

Furthermore, in the foregoing embodiment, the protruding portions 213 are provided at the coupling portions 21. However, the positions at which the protruding portions 213 are provided do not have to be limited to this example, and the protruding portions 213 may be provided at the end face 310 of the link member 31. In this case, if the end face 210 of the coupling portion 21 is provided with holes for receiving the protruding portions 213, the coupling portion 21 and the link member 31 can be coupled with each other as described above.

3.13

Furthermore, in the foregoing embodiment, the wiring board 163 of the encoder 16 is extended to the outside from the first rotatable member 11 side. However, the direction in which the wiring board 163 is extended to the outside does not have to be limited to this example. For example, if the detecting element 162 is arranged on the second rotatable member 12 side, a wiring groove portion similar to the wiring groove portion 114 may be provided in the second rotatable member 12, and the wiring board 163 may be arranged so as to be extended to the outside from the second rotatable member 12 side. Furthermore, both of the rotatable members (11 and 12) may be provided with the wiring groove portions 114, and the direction in which the wiring board 163 is extended to the outside may be selected according to a situation in which the joint structure 1 is to be used.

3.14

Furthermore, in the foregoing embodiment, the end faces of the coupling portions 21 arranged at the side wall portions (113 and 123) of the rotatable members (11 and 12) are formed as flat faces, except for the protruding portions 213. However, the shape of the coupling portions 21 does not have to be limited to this example.

Figure 17:
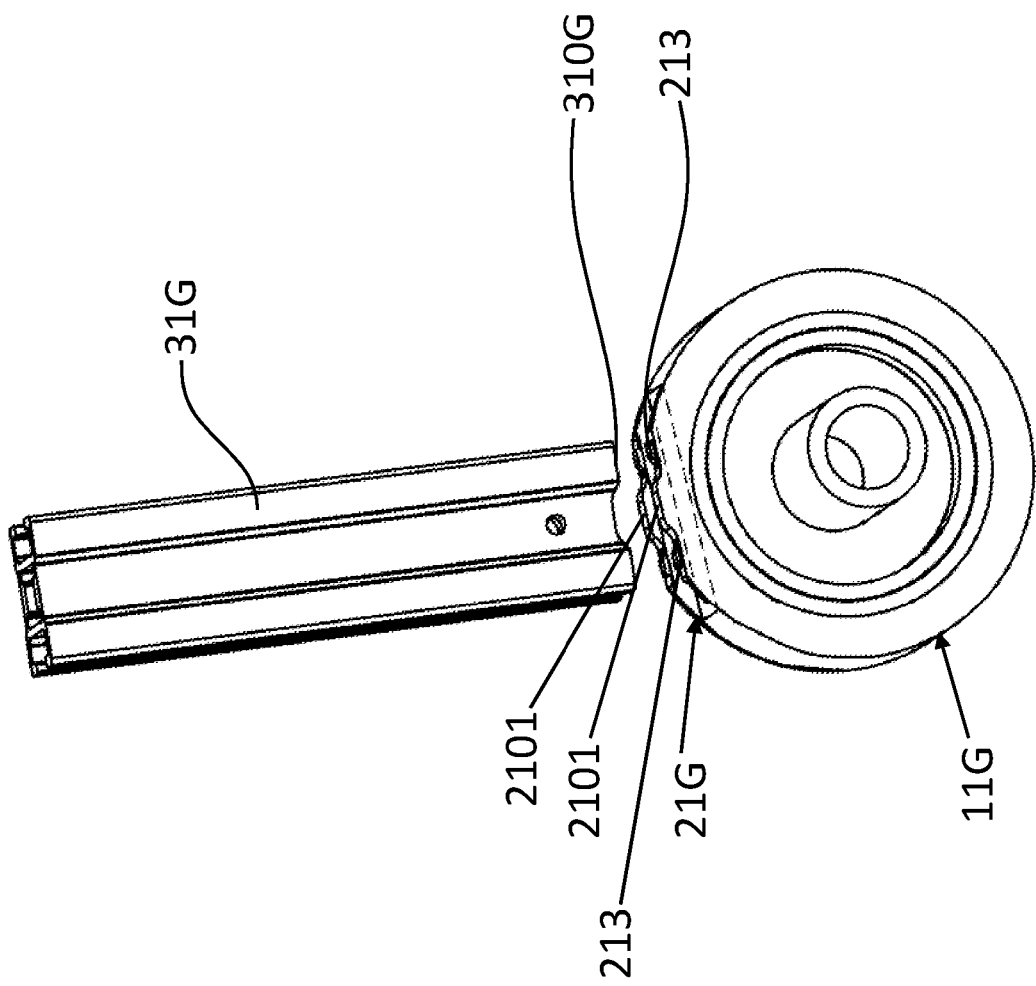
FIG. 17 is a perspective view schematically showing an example of a rotatable member according to another embodiment.

FIG. 17 shows a modified example of the shape of each coupling portion 21. A rotatable member 11G shown in FIG. 17 is formed so as to be similar to the first rotatable member 11, except for a coupling portion 21G. Furthermore, the coupling portion 21G is formed so as to be similar to the coupling portion 21, except for the shape of its end face. Furthermore, a link member 31G is formed so as to be similar to the link member 31, except for the shape of its end face.

In this modified example, a recess portion recessed in the longitudinal direction is provided at the center of the end face of the link member 31. In conformity with this aspect, the coupling portion 21G arranged at a side wall portion of the rotatable member 11G is configured so as to have a projecting portion 2101 projecting outward in the radial direction at the center in the tangential direction. Furthermore, at the end face of the coupling portion 21G, the positions on both sides of the projecting portion 2101 are formed as flat faces that are slightly lower than the projecting portion 2101, and the protruding portions 213 are arranged at these portions. Note that this coupling portion 21G can be applied not only to the first rotatable member 11 but also to the second rotatable member 12.

According to this modified example, in each coupling portion 21G, the length in the radial direction of the thick-wall portions can be made shorter by the length of the projecting portion 2101 being provided. Thus, in this modified example, the position of the groove portion into which the head portion 321 of the wedge member 32 is inserted can be changed slightly to the outer side in the radial direction, compared with the foregoing embodiment. Accordingly, the internal space of the joint structure can be increased, and thus a bearing with a large diameter can be arranged inside and the strength of the joint structure can be improved. Furthermore, since the diameter of the hollow portion of the shaft member can be increased, the joint structure can be made lighter. Furthermore, since the outer diameter of the shaft member can be increased, the rigidity of the shaft member can be improved.

3.15

Furthermore, in the foregoing embodiment, the thrust bearing 14 and the radial bearings 15 are used as bearings that are arranged inside the joint structure 1. However, the bearings that can be used do not have to be limited to these, and may be selected as appropriate according to an embodiment.

Figure 18:
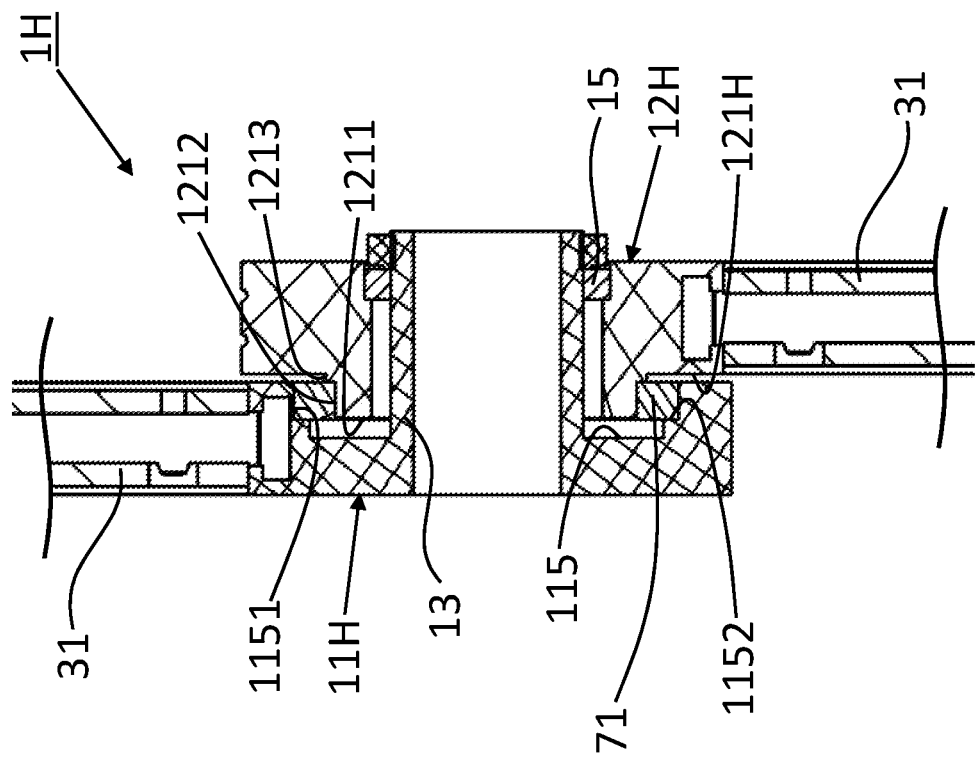
FIG. 18 is a cross-sectional view schematically showing an example of a joint structure according to another embodiment.

FIG. 18 shows a modified example using a bearing different from that in the foregoing embodiment. A joint structure 1H given as an example in FIG. 18 includes a first rotatable member 11H and a second rotatable member 12H. The first rotatable member 11H is formed so as to be substantially similar to the first rotatable member 11, and the second rotatable member 12H is formed so as to be substantially similar to the second rotatable member 12.

The recess portion 115 of the first rotatable member 11H is formed in the shape of a circular ring, and the base of an inner circumferential face 1151 of the recess portion 115 is provided with a step portion 1152 in the shape of a circular ring extending inward in the radial direction from the inner circumferential face 1151. Meanwhile, the first face portion 121 of the second rotatable member 12 that faces the recess portion 115, the second rotatable member 12 being adjacent to the first rotatable member 11H, is provided with a projecting portion 1211 in the shape of a circular ring with a diameter smaller than that of the recess portion 115 and the step portion 1152. Furthermore, the base of an outer circumferential face 1212 of the projecting portion 1211 is provided with a step portion 1213 in the shape of a circular ring extending outward in the radial direction from the outer circumferential face 1212 of the projecting portion 1211.

In this internal structure of the joint structure 1H, a cross roller bearing 71 in the shape of a ring is arranged so as to be supported by the inner circumferential face 1151 of the recess portion 115, a face along the axial direction of the step portion 1152 of the recess portion 115, the outer circumferential face 1212 of the projecting portion 1211, and a face along the axial direction of the step portion 1213 of the projecting portion 1211. The cross roller bearing 71 can receive a load that acts in the axial direction and the radial direction on the joint structure 1H. Note that, if three or more rotatable members are provided, this structure having such a built-in bearing may be provided in each gap between two adjacent rotatable members.

According to this modified example, the following effects can be achieved. That is to say, typically, the inner diameter of the cross roller bearing 71 is larger than the inner diameter of the thrust bearing. Thus, in this modified example, an available region inside the bearing is wide. Accordingly, for example, the outer diameter of the shaft member 13 can be increased, and thus the rigidity of the shaft member 13 can be improved. Moreover, the radial bearings 15 with a large diameter can be used, and thus a load that is received by the radial bearings 15 can be increased. Furthermore, the diameter of the hollow portion of the shaft member 13 can be increased, and thus the joint structure can be made lighter.

LIST OF REFERENCE NUMERALS

1 Joint structure
11 First rotatable member
111 First face portion
112 Second face portion
113 Side wall portion,
114 Wiring groove portion
115 Recess portion
116 Gap portion
12 Second rotatable member
121 First face portion
122 Second face portion
123 Side wall portion
124 Through hole
125 Interlock projecting portion
126 First recess portion
127 Second recess portion
128 Projecting portion
129 Wire-driving groove portion
13 Shaft member
131 Fastener
132 Hollow portion
133 Base portion
134 Cylindrical portion
14 Thrust bearing
141 Washer
142 Plate
143 Hole portion
15 Radial bearing
16 Encoder
161 Scale
162 Detecting element
163 Wiring board
164 Projecting portion
165 Connector portion
17 Cable
171 Connector portion
21 Coupling portion
210 End face
211 Groove portion
212 Thick-wall portion
213 Protruding portion
214 Bottom portion
31 Link member
310 End face
311 Hole portion
312-313 Through hole
314 Groove portion
315 Edge portion
32 Wedge member
321 Head portion
322 Body portion
323 Through hole
324 Tapered portion
33 Screw
331 Head portion
332 Tapered portion
333 Male thread portion
400 Robot
401 Base
402 Support
403-404 Actuator
405-406 Movable portion
407a-407h Link member
408a-408f Joint structure
409 Front end portion
410 Robot
411 Link member
412 Joint structure
413-414 Fixture
415-416 (Bowden) wire
417 Binding member
420 Delta robot
421 Base portion
422 Rotary motor
423a-423e Link member 424 Joint structure
425 Front end portion
426 Link portion
420A Delta robot
427 Linear motor
1A Joint structure
13A Shaft member
18 Third rotatable member
1B Joint structure
11B First rotatable member
111B First face portion
21B Coupling portion
400C Robot
1C Joint structure
31c Link member
1D Joint structure
11D First rotatable member
117 Recess portion
12D Second rotatable member
13D Shaft member
133 Base portion
134 Cylindrical portion
18D Third rotatable member
34 Link member
1E Joint structure
11E First rotatable member
12E Second rotatable member
51 Reinforcing plate
511-514 Reinforcing plate-corresponding recess portion
19 Rotatable member
21F Coupling portion
31F Link member
61 Soft magnetic plate
62 Permanent magnet
63-64 Soft magnetic pin
65 Non-magnetic bolt

What is claimed is:

1. An externally-driven joint structure comprising:
a shaft member that extends in an axial direction; and
a plurality of rotatable members that are arranged along the axial direction, and are coupled with each other by the shaft member in an axially rotatable manner,
wherein each of the rotatable members comprises:
a pair of face portions that are parallel to each other in the axial direction,
a side wall portion that is arranged along outer circumferential edges of the pair of face portions, and
at least one coupling portion that is arranged at the side wall portion, and is coupled with a link member constituting a link of a robot, and
wherein the face portions of each of the rotatable members are provided with a recess portion with a shape that allows a bearing in the shape of a ring that receives a force that acts in the axial direction to be accommodated between rotatable members that are adjacent to each other in the axial direction, and
the side wall portions of the rotatable members are formed in the shape of a cylinder, and the coupling portions arranged at the side wall portions have a shape obtained by cutting, in a tangential direction that is perpendicular to a radial direction of the side wall portions, arc portions of the side wall portions.

2. The externally-driven joint structure according to claim 1, wherein at least one rotatable member of the plurality of rotatable members comprises a plurality of the coupling portions arranged at the side wall portion.

3. The externally-driven joint structure according to claim 1, wherein an encoder for detecting a relative rotational angle between the rotatable members that are adjacent to each other in the axial direction is further accommodated between the recess portions of the adjacent rotatable members.

4. The externally-driven joint structure according to claim 1,
wherein the recess portions are formed in the shape of a circular ring,
bases of inner circumferential faces of the recess portions are provided with a step portion in the shape of a circular ring extending inward in a radial direction from the inner circumferential faces,
a face portion of a rotatable member that faces the recess portions, the rotatable member being adjacent to the rotatable members, is provided with a projecting portion in the shape of a circular ring with a diameter smaller than that of the recess portions,
a base of an outer circumferential face of the projecting portion is provided with a step portion in the shape of a circular ring extending outward in the radial direction from the outer circumferential face of the projecting portion, and
a cross roller bearing as the bearing in the shape of a ring is arranged so as to be supported by the inner circumferential face of the recess portion, a face along the axial direction of the step portion of the recess portion, the outer circumferential face of the projecting portion, and a face along the axial direction of the step portion of the projecting portion.

5. The externally-driven joint structure according to claim 1, comprising two rotatable members,
wherein the coupling portions of the rotatable members are arranged symmetric about the axial direction such that, even when the joint structure is reversed about an axis that is perpendicular to the axial direction, the joint structure can be used while a positional relationship between the link members is maintained,
one of the two rotatable members is formed in one piece with the shaft member,
the other rotatable member of the two rotatable members has a through hole into which the shaft member is allowed to be inserted, and
a radial bearing is arranged so as to be interference-fitted to the shaft member and clearance-fitted to an inner circumferential wall of the through hole, or so as to be clearance-fitted to the shaft member and interference-fitted to the inner circumferential wall of the through hole.

6. A link mechanism comprising:
two or more joint structures according to claim 5; and
the link members that are coupled with each of the coupling portions of each of the joint structures,
wherein two joint structures that are adjacent to each other via the link member are arranged such that one of the joint structures is used in a state of being reversed about an axis that is perpendicular to the axial direction with respect to the other joint structure so that the two rotatable members of each of the two joint structures face each other in the direction that is perpendicular to the axial direction.

7. The externally-driven joint structure according to claim 1, comprising three or more rotatable members,
wherein the coupling portions of at least two rotatable members of the three or more rotatable members are coupled with a same link member.

8. The externally-driven joint structure according to claim 1, wherein coupling between the coupling portions and the link member is constituted by a magnet.

9. The externally-driven joint structure according to claim 1, wherein the side wall portions of the rotatable members have a height that matches a thickness of the link member.

10. The externally-driven joint structure according to claim 1, wherein the coupling portions arranged at the side wall portions have a projecting portion projecting outward in a radial direction at a center in the tangential direction that is perpendicular to the radial direction of the side wall portions, in conformity with a recess portion provided at a center of an end face of the link member.

11. The externally-driven joint structure according to claim 1, wherein a reinforcing plate for supporting a coupling region of the coupling portion arranged at the side wall portion of the rotatable member and the link member is provided on at least one of both sides in the axial direction of the coupling region.

12. A link mechanism comprising:
   the joint structure according to claim 1; and
   the link member that is coupled with the coupling portion arranged at the side wall portions of the rotatable members of the joint structure,
   wherein the side wall portions of the rotatable members of the joint structure comprise a wire-driving groove portion,
   a fixture is attached to the link member, and
   a wire that is driven by an external drive source is arranged along the wire-driving groove portion, and the end portion of the wire is fixed to the fixture.

\* \* \* \* \*